12) United States Patent
Shigematsu et al.

(10) Patent No.: US 9,027,442 B2
(45) Date of Patent: May 12, 2015

(54) MULTI-SHAFT DRIVE DEVICE

(75) Inventors: Ryohei Shigematsu, Yokohama (JP);
Kiyoshi Nakajima, Yokohama (JP);
Kenji Murakami, Yokohama (JP);
Takahiro Fujii, Yokohama (JP); Shinji Iino, Yokohama (JP); Hiroshi Yagame, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 387 days.

(21) Appl. No.: 13/391,777

(22) PCT Filed: Aug. 27, 2010

(86) PCT No.: PCT/JP2010/064628
§ 371 (c)(1),
(2), (4) Date: Feb. 22, 2012

(87) PCT Pub. No.: WO2011/024964
PCT Pub. Date: Mar. 3, 2011

(65) Prior Publication Data
US 2012/0144943 A1 Jun. 14, 2012

(30) Foreign Application Priority Data

Aug. 28, 2009 (JP) ................................ 2009-197958
May 17, 2010 (JP) ................................ 2010-112816

(51) Int. Cl.
*B60N 2/02* (2006.01)
*F16H 37/06* (2006.01)
*F16H 63/30* (2006.01)

(52) U.S. Cl.
CPC ......... B60N 2/0296 (2013.01); *Y10T 74/19279* (2015.01); *Y10T 74/19251* (2015.01);
(Continued)

(58) Field of Classification Search
CPC .......... B60N 2/0232; B60N 2/06; B60N 2/18; B60N 2/22; B60N 2/44; B60N 2/0296; B60N 2002/0236; F16H 37/065; F16H 2025/209; Y10T 74/19279; Y10T 74/19284; Y10T 74/19251; Y10T 74/19307; Y10T 74/19358; Y10T 74/19353; Y10T 74/1934; Y10T 74/19344; Y10T 74/194
USPC ......... 74/664, 665 A, 665 B, 665 C, 665 GB, 74/665 F, 665 M, 665 P, 337.5, 335, 89.16, 74/89.14, 89.11, 89.19, 423; 297/344.13, 297/344.11, 344.12, 344.17, 344.1, 344.15
See application file for complete search history.

(56) References Cited

U.S. PATENT DOCUMENTS 3,119,537 A * 1/1964 Smits ........................... 226/111
4,090,413 A * 5/1978 Vickland ................... 74/665 GB
(Continued)

FOREIGN PATENT DOCUMENTS

CN U-2124686 12/1992
DE B3-102 47 703 4/2004
(Continued)

OTHER PUBLICATIONS

Feb. 27, 2014 First Office Action issued in Chinese Application No. 201080038249.1 (with English Translation).
(Continued)

*Primary Examiner* — Ha D Ho
*Assistant Examiner* — Jude Agendia
(74) *Attorney, Agent, or Firm* — Oliff PLC

(57) ABSTRACT

Output gears are disposed so as to be movable toward and counter to plural second input gears to which rotation of the motor is transmitted, and so as to be biased toward the plural second input gears. A cam, which has plural recesses provided at the periphery thereof, is disposed at the inside of the output gear. The cam is rotated, and a pin of the output gear enters the recess, so that the output gear is moved toward the second input gear, and the output gear is engaged with the second input gear.

18 Claims, 19 Drawing Sheets

(52) U.S. Cl.
CPC ............ *F16H37/065* (2013.01); *F16H 63/304* (2013.01); *F16H 2063/3056* (2013.01); *B60N 2/0232* (2013.01)

(56) References Cited

U.S. PATENT DOCUMENTS

| | | | | |
|---|---|---|---|---|
| 4,299,316 | A | * | 11/1981 | Reinmoeller ................ 192/48.8 |
| 4,309,015 | A | * | 1/1982 | Muhr ............................ 248/396 |
| 4,819,507 | A | * | 4/1989 | Pescher .................... 74/665 GA |
| 4,895,052 | A | * | 1/1990 | Gleasman et al. ................ 475/7 |
| 5,163,734 | A | * | 11/1992 | Hakansson ................... 297/330 |
| 5,791,622 | A | * | 8/1998 | Gauger ......................... 248/430 |
| 6,626,064 | B1 | * | 9/2003 | Maue et al. ................. 74/665 F |
| 7,360,471 | B2 | * | 4/2008 | Lavoie et al. .................... 74/724 |
| 8,621,960 | B2 | * | 1/2014 | Wrong ....................... 74/665 A |

FOREIGN PATENT DOCUMENTS

| | | |
|---|---|---|
| JP | U-50-28181 | 4/1975 |
| JP | U-52-164671 | 12/1977 |
| JP | A-54-108169 | 8/1979 |
| JP | Y2-54-41898 | 12/1979 |
| JP | U-56-113258 | 9/1981 |
| JP | A-58-97528 | 6/1983 |
| JP | A-62-183504 | 8/1987 |
| JP | Y2-1-25800 | 8/1989 |
| JP | A-3-501832 | 4/1991 |
| JP | A-6-87363 | 3/1994 |
| JP | A-6-156123 | 6/1994 |
| JP | U-6-43399 | 6/1994 |

OTHER PUBLICATIONS

Reasons for Rejection dated Apr. 8, 2011 in Japanese Patent Application No. 2011-506512 (with translation).
International Search Report dated Nov. 22, 2010 in International Application No. PCT/JP2010/064628.
Oct. 16, 2013 Korean Office Action issued in Korean Patent Application No. 10-2012-7006396 (with translation).
Aug. 19, 2014 Extended Search Report issued in European Patent Application No. 10812013.0-1758.

* cited by examiner

MULTI-SHAFT DRIVE DEVICE

TECHNICAL FIELD

The present invention relates to a multi-shaft drive device in which plural output shafts are driven by one motor which is desirably used for, for example, electrical seats for vehicles or the like.

BACKGROUND ART

In seats for vehicles, there are many features having parts of which plural positions can be adjusted (for example, front-back direction slide of entire seat, up-and-down motion of seating face height, or reclining of seatback (backrest) can be adjusted) in accordance with body type or position of a passenger. The adjustments of these movable parts have been manually performed, but electrical seats, which are adjusted by motor drive, are provided as more useful seats.

In order to drive plural movable parts independently, an electrical seat is thought of as having a structure in which one motor is connected to each output shaft connected to the movable parts. However, the number of motors is increased. Therefore, it is efficient to drive plural output shafts by one motor. In order to realize this, it is known that motor power is transmitted to each output shaft, which is connected to plural movable parts, via a clutch, and the clutch is connected or disconnected and each movable part is selectively driven (see Patent Documents 1 to 4).

Patent Document 1 is Japanese Unexamined Patent Application Publication No. S58-97528. Patent Document 2 is Japanese Unexamined Patent Application Publication No. H6-87363. Patent Document 3 is Japanese Unexamined Patent Application Publication No. S62-183504. Patent Document 4 is Japanese Unexamined Patent Application Publication No. H6-156123.

DISCLOSURE OF THE INVENTION

Problems Solved by the Invention

In drive devices using an electromagnetic clutch disclosed in Patent Documents 1 and 2 of the above Patent Documents, the cost of an electromagnetic clutch is high, and the electromagnetic clutch thereby has economics disadvantage. From the viewpoint of economics, since the drive devices disclosed in Patent Documents 3 and 4 use a mechanical clutch, cost may be reduced. However, the drive devices disclosed in Patent Documents 3 and 4 do not consider the weight reduction of a selector mechanism for the output shaft and the space reduction.

An object of the present invention is to provide a multi-shaft drive device which can perform weight reduction and space reduction by using a mechanical clutch having a simplified structure for driving plural output shafts by one motor.

Means for Solving the Problems

According to one aspect of the present invention, a multi-shaft drive device includes: an input member which is connected to a rotational shaft of a motor; plural output members which have an output shaft and are engageably provided to the input member, and to which rotation of the input member is transmitted when engaging with the input member; a selector member which is provided between the plural output members and has an action portion, the selector member being activated, the action portion facing one of the output members and acting thereon, thereby moving the one of the output members toward the input member and selectively engaging the one of the output members with the input member; and a rotary operational member which is connected to the selector member, the operational member being rotated so that selector member is activated.

In the multi-shaft drive device as structured above, the selector member is rotated by the operational member, the action portion faces one of the output members, and the output member is moved toward the input member, and the output member engages with the input member. Thus, the rotation of the input member can be transmitted to the output member. In the one aspect of the present invention, since the mechanism for selectively providing the power of the motor to the plural output members and the selection of the output member to be activated are realized by a compact structure in which the output members are disposed around the selector member, weight reduction and space reduction can be performed.

According to one desirable embodiment of the present invention, the action portion of the selector member may be a recess or a projection which is formed on a facing surface of the selector member which faces the output member.

According to another desirable embodiment of the present invention, the action portion of the selector member may be provided in a condition of plural steps in a direction perpendicular to an activating direction of the selector member. In this embodiment, many output shafts can be arranged in accordance with the number of steps of the cam surface, and more output shafts can be provided in the device.

According to another desirable embodiment of the present invention, facing angle of the output shaft with respect to the action portion may be freely selected. In this embodiment, the output member can be disposed in accordance with the extending direction of the desirable output member.

According to another desirable embodiment of the present invention, the action portion may be the recess, and the output member may have a projection which projects from a front end surface of the output member and enters the recess. Alternatively, the action portion may be the projection, and the output member may be pressed by the projection.

According to another desirable embodiment of the present invention, the output member may have a bevel gear, and the input member may have a bevel gear of which an axis crosses an axis of the bevel gear of the output member and engages with the bevel gear of the output member.

According to another desirable embodiment of the present invention, the input member may be a spur gear to which rotation of the motor is transmitted, and the output member may have a spur gear which engages with the spur gear of the input member.

According to another desirable embodiment of the present invention, action mode of the selector member may be rotation or linear movement.

When the action mode of the selector member is rotation, the following embodiments can be desirably used.

According to another desirable embodiment of the present invention, the multi-shaft drive device may have a biasing means which biases the output member toward the input member; and the selector member may have a peripheral portion and the recess, wherein the peripheral portion may have a cylindrical curved surface and may allow the output member to be apart from the input member by contacting the output member, and the recess may be provided at the peripheral portion and may allow the output member to enter the recess and to be moved toward the input member. In this embodiment, the recess may face the output member by rotation of the selector member, so that the output member may be moved by the biasing force of the biasing means, and may engage with the input member. Thus, by one action in which the selector member is rotated, the output member may engage with the input member. When the output member enters the recess, click feeling can be obtained. Therefore, the operability and the feeling of operation may be good.

In the action portion of the present invention, a projection can be provided instead of the recess. That is, the multi-shaft drive device may have a biasing means which biases the output member in a direction in which the output member is apart from the input member, and the selector member may have a peripheral portion and the projection, the peripheral portion may have a cylindrical curved surface and may allow the output member to be apart from the input member by contacting the output member, the projection may be provided at the peripheral portion, and may press the output member and may thereby move the output member toward the input member. In this embodiment, by one action in which the selector member is rotated, the output member can be engaged with the input member.

When the action mode of the selector member is rotation, the input member can consist of one gear. According to another desirable embodiment of the present invention, the input member may have: a first input gear which is connected to the rotational shaft of the motor; and plural second input gears which are provided at a peripheral side of the first input gear, wherein the second input gear may have: a first gear portion which engages with a peripheral portion of the first input gear; and a second gear portion which removably engages with the output member. In this embodiment, since the output member can be engaged with the second gear portion from an arbitrary direction, freedom of design can be increased as described hereinafter.

That is, it is desirable that the output member can be freely positioned along a circle of which center is an axis of the second input gear. It is desirable that the second input gear can be freely positioned along a circle of which center is an axis of the first input gear. In the embodiment, the position and the angle of the output member can be appropriately changed in accordance with the position of the member to which the output member is connected or the like.

When the action mode of the selector member is linear movement, the following embodiments can be used.

According to another desirable embodiment of the present invention, the linear movement of the selector member may be performed by a rack and pinion mechanism provided between the selector member and the operational member.

According to another desirable embodiment of the present invention, the multi-shaft drive device may have a biasing means which biases the output member toward the input member and the selector member may have a cam surface and the recess, the cam surface may allow the output member to be apart from the input member by contacting the output member, and the recess may be provided at the cam surface and may allow the output member to enter the recess and to be moved toward the input member. In this embodiment, when the output member enters the recess, click feeling can be obtained, so that the operability and the feeling of operation may be good.

According to another desirable embodiment of the present invention, the multi-shaft drive device may have a biasing means which biases the output member in a direction in which the output member is apart from the input member, and the selector member may have a cam surface and the recess, the cam surface may allow the output member to be apart from the input member by contacting the output member, the projection may be provided at the cam surface, and may press the output member and may thereby move the output member toward the input member.

According to another desirable embodiment of the present invention, the multi-shaft drive device may have a stopper means which controls a movement range of the selector member. In this embodiment, removal of the output member from the cam surface can be prevented.

According to another desirable embodiment of the present invention, multi-shaft drive device may use a feature in which a movable portion of a predetermined movable mechanism is connected to the output member, a switch which activates the motor is slidably provided at the operational member, the switch is slid in one direction, and the motor is thereby rotated in a normal direction, and the switch is slid in a direction opposite to the one direction, and the motor is thereby rotated in a reverse direction, and slide direction of the switch corresponds to a movable direction of the movable portion. The movable mechanism can be a vehicle seat. In this case, the output member may be connected to an adjustment mechanism of the movable portion of the vehicle seat. In this embodiment, the feeling of operation corresponds to the actual movement, and there is an advantage that the multi-shaft drive device is thereby easily used.

Effects of the Invention

According to the present invention, since the mechanism for selectively providing the power of the motor to the plural output members and the selection of the output member to be activated are obtained by a compact structure, weight reduction and space reduction can be performed.

EXPLANATION OF REFERENCE NUMERALS

Figure 1:
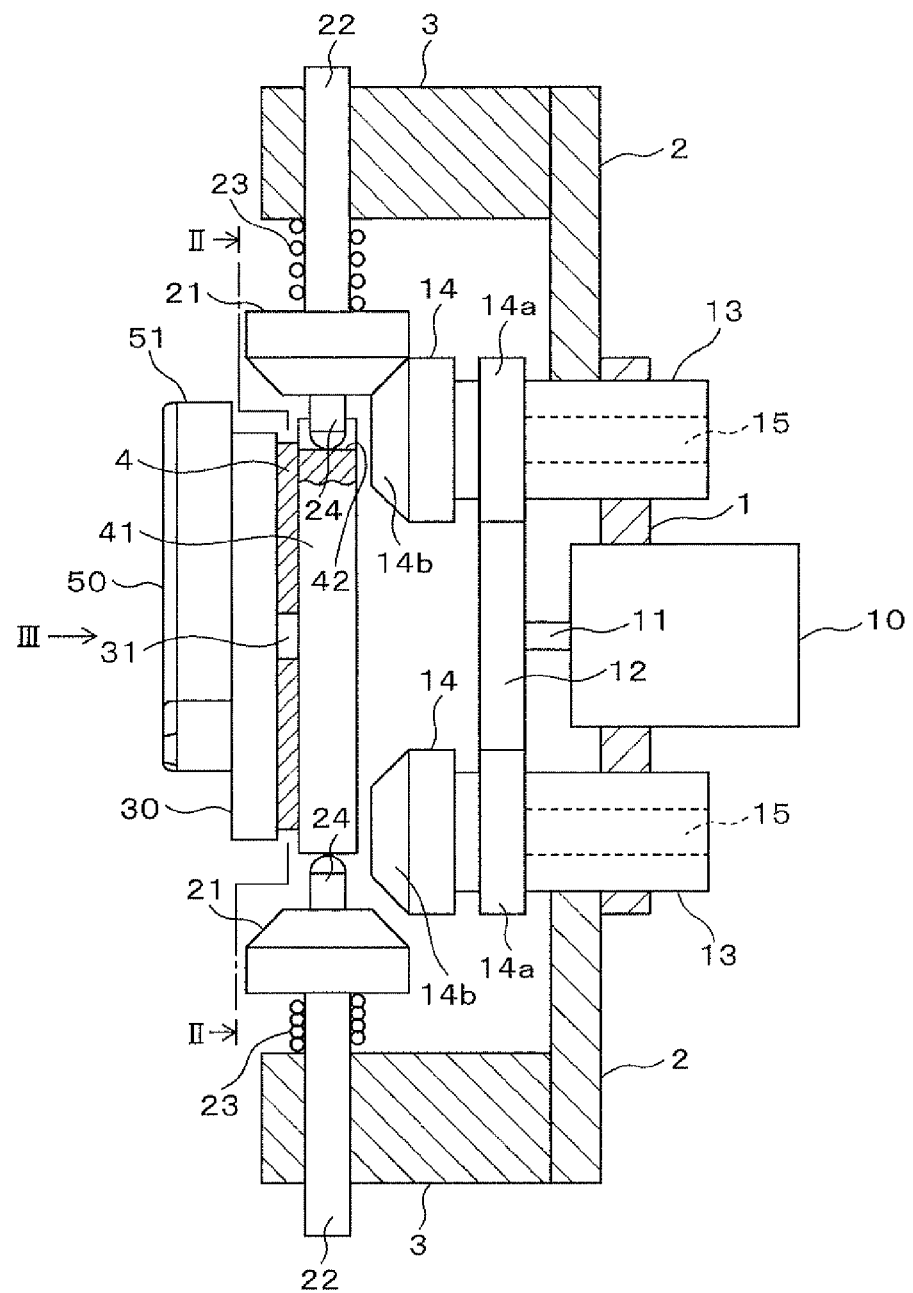
FIG. 1 is a front view of a multi-shaft drive device, which includes local sectional view of a portion thereof and is taken along line I-I in FIG. 3 of a first embodiment according to the present invention.

Reference numerals 10, 140, and 200 denote a motor, 11,141, and 201 denote a motor shaft (rotational shaft of motor), 12 denotes a first input gear (spur gear), 14 denotes a second input gear (input member), 14a denotes a spur gear portion (first gear portion), 14b denotes a bevel gear portion (second gear portion), 21 denotes an output gear (output member), 22, 25, 62, and 72 denote an output shaft (output member), 23 and 133 denote a coil spring (biasing means), 24 denotes a pin (projection), 30 and 120 denote a dial (operational member), 41 denotes a cam (selector member), 42, 112, 233, 243, 253, 263, 273, and 283 denote a recess (action portion), 50 denotes a switch, 61 denotes an output gear (output member), 110, 230, 240, 250, 260, 270, and 280 denote a cam member (selector member), 111 denotes a cam surface (action portion), 130 denotes an output shaft (output member), 133 and 213 denote a compression spring (biasing member), 143 denotes a clutch shaft (input member), 202 denotes an input gear (input member), and 210 denotes an output shaft (output member).

EMBODIMENTS OF THE INVENTION

Embodiments of the present invention will be described with reference to the Figures hereinafter.

[1] First Embodiment

FIGS. 1 to 11

(1) Structure of First Embodiment

FIGS. 1 to 4C show a multi-shaft drive device of the first embodiment. For example, this multi-shaft drive device is desirably constructed such that three movable mechanisms of a vehicle electrical seat (electrical seat used for vehicles) are activated by one motor 10 which rotates in a normal direction and an opposite direction. In this case, the three movable mechanisms are a mechanism which adjusts seating face height, a mechanism which adjusts an angle of seat backrest section, and a mechanism which adjusts a front-back position of seat. The power of the motor 10 is selectively provided so as to activate the movable mechanisms.

As shown in FIG. 1, the motor 10 is fixed to a main frame 1 having a circular plate-shape. In this case, one end portion of the motor 10, at which a motor shaft (rotational shaft of motor) 11 projects, is fixed to the main frame 1. A first input gear 12 is fixed at a leading end of the motor shaft 11. Three bearings 13 are disposed around the motor 10 in a concentric pattern of which center is positioned at the motor 10. Shafts 15 of second input gears (input members) 14 are rotatably supported by the bearings 13. The second input gears 14 have spur gear portions (first gear portions) 14a and bevel gear portions (second gear portions) 14b. The spur gear portion 14a engages with the first input gear 12. The bevel gear portion 14b is positioned apart a predetermined distance from the spur gear portion 14a. The three second input gears 14 are positioned such that each rotational center of the three second input gears 14 is positioned at a vertex of an isosceles triangle.

A rectangular plate-shaped subframe 2 is provided on the main frame 1. An end portion of the subframe 2 is cut to have a semicircular shape, and the end portion is fitted into a side surface of the bearing 13. The subframe 2 is rotated around the bearing 13, so that the subframe 2 can be positioned and fixed at a desired position. Bearing blocks 3 are provided on a surface of the subframe 2, and output shafts 22 of output gears (output members) 21 are rotatably supported by the bearing blocks 3. The output gear 21 is a bevel gear which can engage with the bevel gear portion 14b of the second input gear 14, and the output gear 21 is biased toward the leading end side thereof (the side of the bevel gear portion 14b) by a coil spring 23. A pin 24 projecting toward the leading end side is integrally formed at a center of front end surface of the output gear 21. The leading end of the pin 24 is formed to have a hemispherical shape.

Figure 3:
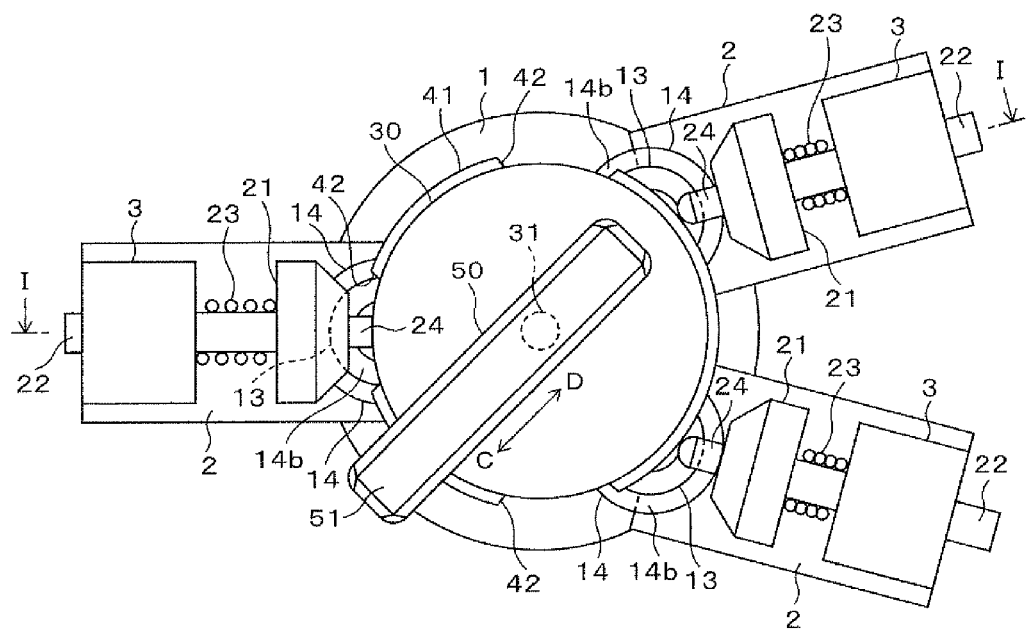
FIG. 3 is an arrow view taken in the direction of arrow III in FIG. 1.

In FIGS. 1 and 3, reference numeral 30 denotes a circular plate-shaped dial (operational member). The dial 30 has a rotational shaft 31 at a center thereof. The rotational shaft 31 extends coaxially with the motor shaft 11 and is rotatably supported by a frame 4. A cam (selector member) 41 is fixed at an end portion of the rotational shaft 31.

Figure 2:
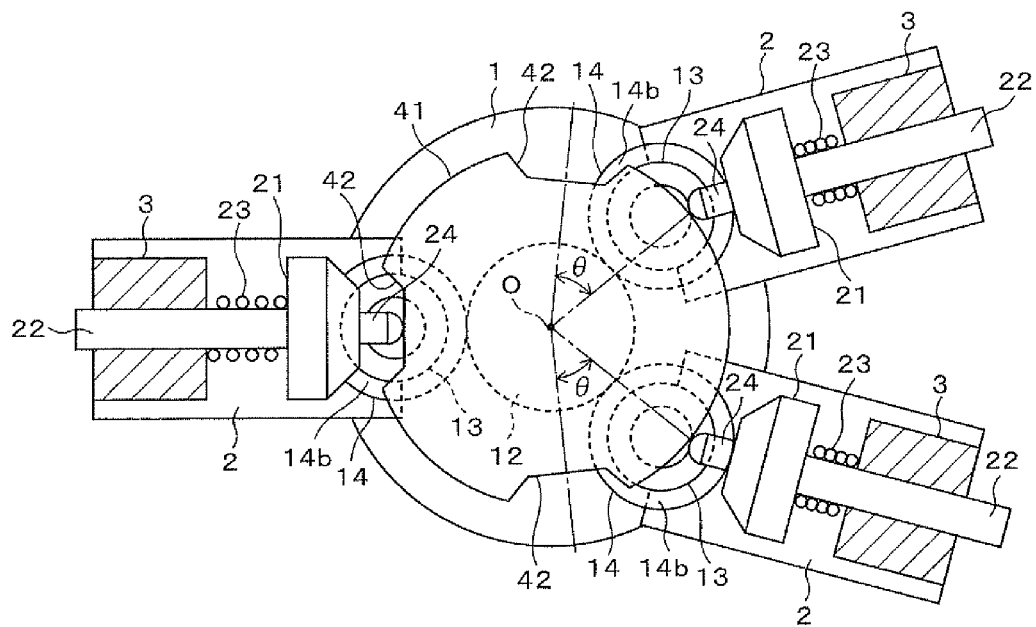
FIG. 2 is a perspective view taken along line II-II in FIG. 1.

The cam 41 has a circular plate-shape, and recesses 42 having a roughly trapezoidal shape are formed at a peripheral portion thereof. As shown in FIG. 2, the pin 24 of one of the output gears 21 is projected toward the leading side thereof by the coil spring 23, thereby entering the recess 42, and the output gear 21 engages with the bevel gear portion 14b of the second input gear 14. Thus, the rotation of the motor 10 is transmitted from the first input gear 12 and the second input gear 14 to the output shaft 22 through the output gear 21.

On the other hand, the pins 24 of the other two output gears 21 abut to a peripheral surface of the cam 41, and the output gear 21 is apart from the bevel gear portion 14b of the second input gear 14. As shown in FIGS. 1 to 3, the pin 24 of the output gear 21, which is positioned to have an apex angle of isosceles triangle, enters the recess 42. In this condition, when each contact point, at which the pins 24 of the other two output gears 21 contact the peripheral surface of the cam 41, and the center point of the first input gear 12 are connected with a straight line, centers of the other two recesses 42 are positioned at points inclined at predetermined angle θ (45 degrees in this embodiment) from each straight line.

Therefore, when the cam 41 is rotated by 45 degrees from the condition shown in FIG. 2 in clockwise direction, the pin 24 of the output gear 21 enters the recess 42 at the upper side of the cam 41, and the pins 24 of the other two output gears 21 move on the peripheral surface of the cam 41. In contrast, when the cam 41 is rotated by 45 degrees from the condition shown in FIG. 2 in counterclockwise direction, the pin 24 of the output gear 21 enters the recess 42 at the lower side of the cam 41, and the pins 24 of the other two output gears 21 move on the peripheral surface of the cam 41. Thus, the cam 41 is rotated by 45 degrees, so that one of the output gears 21 can engage with the bevel gear portion 14b of the second input gear 14.

The rotation of the cam 41 is performed by rotation of the dial 30. The pin 24 enters the recess 42, so that click feeling in operation can be obtained, and the dial 30 can be reliably positioned at a connection position of the output gear 21.

A switch 50 having a rectangular parallelepiped shape is provided at a surface of the dial 30, and the switch 50 is used for selection of ON/OFF and rotational direction of the motor 10. The switch 50 slides toward both sides of longitudinal direction (C-D direction in FIG. 3), and the switch 50 is controlled so as to stop at a middle point of slide range by a biasing member (not shown in the Figures). The switch 50 extends so as to pass through the center point of the dial 30, and one end portion of the switch 50 projects from the dial 30 and is positioned at the outside thereof. The projection end of the switch 50 is used as an indication portion 51.

As shown in FIG. 3, in the condition in which the pin 24 of the output gear 21 positioned to have an apex angle of an isosceles triangle enters the recess 42, the switch 50 is provided to the dial 30 such that the indication portion 51 is inclined at 45 degrees from a center line of the pin 24 in a counterclockwise direction.

When the switch 50 is positioned at the middle point in the stop condition in which the switch 50 does not move in a longitudinal direction, the motor 10 is in a power-off condition. For example, when the switch 50 slides in the C direction, the motor 10 rotates in a normal direction. For example, when the switch 50 slides in the D direction, the motor 10 rotates in an opposite direction. In this manner, the motor 10 is driven.

(2) Application Example and Action of First Embodiment

The multi-shaft drive device of the first embodiment has the above structure. Next, an example in which the multi-shaft drive device is used for vehicle electric seat will be explained with reference to FIGS. 4A to 4C.

First, the multi-shaft drive device is provided at a position on a side surface of seat cushion, and th position allows a passenger, who sits on the seat cushion, to operate the dial 30. In this case, the motor shaft 11 extends in right and left direction of vehicle body, and the second input gear 14 positioned to have an apex angle of the isosceles triangle is positioned in the travel direction of the vehicle, and the other second input gears 14 are arranged at upper side and lower side of rear side of the vehicle. The second input gear 14 positioned at the front side is a front side second input gear 14A, the second input gear 14 positioned at the lower side is a lower side second input gear 1413, and the second input gear 14 positioned at the upper side is an upper side second input gear 14C. Regarding the output gears 21, the output gear 21 positioned at the front side is a front side output gear 21A, the output gear 21 positioned at the lower side is a lower side output gear 21B, and the output gear 21 positioned at the upper side is an upper side output gear 21C.

A torque cable (not shown in the Figures) is connected to the output shaft 22 of each output gear 21A to 21C. The torque cables transmit rotation of each output shaft 22 to the reclining mechanism which adjusts an angle of seat backrest section, the front-back position adjustment mechanism of the seat, and the seating face height adjustment mechanism, and the torque cables activate the mechanisms. In this case, the output shaft 22 of the front side output gear 21A is connected to the reclining mechanism via the torque cable. The output shaft 22 of the lower side output gear 21B is connected to the seating face height adjustment mechanism via the torque cable. The output shaft 22 of the upper side output gear 21C is connected to the front-back position adjustment mechanism of the seat via the torque cable. A method for activating each mechanism by using the multi-shaft drive device will be explained hereinafter.

(2-1) Front-Back Position Adjustment Mechanism of Seat

Figure 4A:
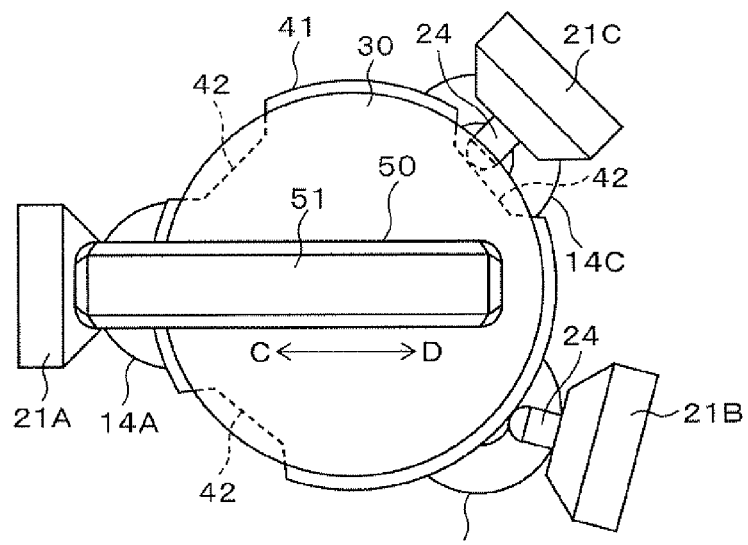
FIG. 4 is a side view showing a use example of the multi-shaft drive of the first embodiment.

In order to adjust the front-back position of the seat by activating the front-back position adjustment, the dial 30 is rotated, and as shown in FIG. 4A, the indication portion 51 of the switch 50 is directed to the front side. Then, the recess 42 of the cam 41 moves so as to face the upper side second input gear 14C, the pin 24 of the upper side output gear 21C enters the recess 42, and the upper side output gear 21C engages with the upper side second input gear 14C. On the other hand, in the front side output gear 21A and the lower side output gear 21B, the pins 24 contact the peripheral surface of the cam 41, and the pins 24 are apart from the front side second input gear 14A and the lower side second input gear 14B.

From this condition, when the switch 50 slides in the front direction (C direction), the motor 10 is rotated, so that the entirety of the seat moves to the front side. When the switch 50 slides in the back direction (D direction), the motor 10 is rotated, so that the entirety of the seat moves to the rear side. The switch 50 is appropriately moved in the front-back direction, so that the front-back position of the seat can be adjusted at a desired position.

(2-2) Reclining Mechanism

Figure 4B:
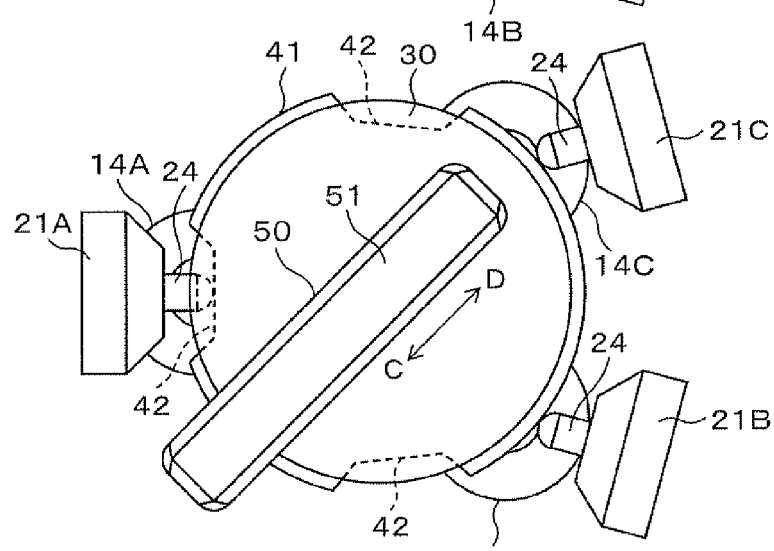

In order to adjust the angle of the seat backrest section by the reclining mechanism, the dial 30 is rotated, and as shown in FIG. 4B, the indication portion 51 of the switch 50 is directed to the front side and obliquely downward at 45 degrees. Then, the recess 42 of the cam 41 moves so as to face the front side second input gear 14A, the pin 24 of the front side output gear 21A enters the recess 42, and the front side output gear 21A engages with the front side second input gear 14A. On the other hand, in the lower side output gear 21B and the upper side output gear 21C, the pins 24 contact the peripheral surface of the cam 41, and the pins 24 are apart from the lower side second input gear 14B and the upper side second input gear 14C.

From this condition, when the switch 50 slides in the diagonally forward direction (C direction), the motor 10 is rotated, so that the backrest of the seat is inclined to the front side. When the switch 50 slides in the diagonally backward direction (D direction), the motor 10 is rotated, so that the backrest of the seat is inclined to the back side. The switch 50 is appropriately moved in the upper and lower direction, so that the backrest can be adjusted at a desired position.

(2-3) Seating Face Height Adjustment Mechanism of Seat

Figure 4C:
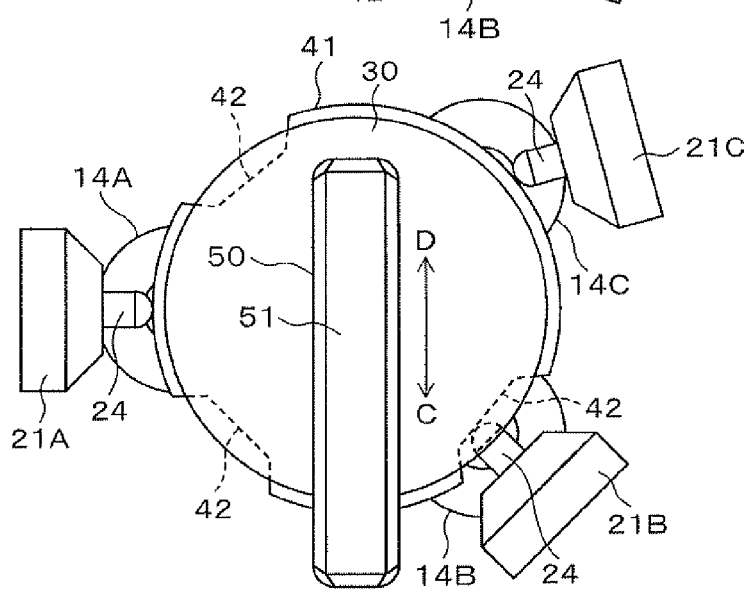

In order to adjust the height of the seating face by activating the seating face height adjustment mechanism, the dial 30 is rotated, and as shown in FIG. 4C, the indication portion 51 of the switch 50 is directed to the lower side. Then, the recess 42 of the cam 41 moves so as to face the lower side second input gear 14B, the pin 24 of the lower side output gear 21B enters the recess 42, and the lower side output gear 21B engages with the lower side second input gear 14B. On the other hand, in the front side output gear 21A and the upper side output gear 21C, the pins 24 contact the peripheral surface of the cam 41, and the pins 24 are apart from the front side second input gear 14A and the upper side second input gear 14C.

From this condition, when the switch 50 slides to the lower direction (C direction), the motor 10 is rotated, so that the seating face moves downwardly. When the switch 50 slides to the upper direction (D direction), the motor 10 is rotated, so that the seating face moves upwardly. The switch 50 is appropriately moved in the upper and lower direction, so that the seating face can be adjusted at a desired position.

(3) Actions and Effects

According to the multi-shaft drive device of the above first embodiment, the mechanism for selectively providing the power of the motor 10 to the plural output shafts 22 is constructed such that the output gear 21 which is integrally formed to each output shaft 22 engages with the second input gear 14. The dial 30 is rotated, and the output gear 21 to be connected is moved to the second input gear 14, so that selection of the output shaft 22 is performed.

That is, since the mechanism for selectively providing the power of the motor 10 to the plural output gears 21 and the selection of the output gear 21 to be activated are obtained by a compact structure, weight reduction and space reduction can be obtained.

In particular, in the above embodiment, by one action in which the cam 41 is rotated, the output gear 21 engages with the second input gear 14, and when the pin 24 of the output gear 21 enters the recess 42, click feeling can be obtained. Thus, the operability and the feeling of operation are good.

The position of the output gear 21 can be freely set along the surrounding area of the second input gear 14, and the second input gear 14 and the output gear 21 can be freely set along the surrounding area of the first input gear 12. Thus, the position and the angle of the output shaft 22 can be appropriately changed in accordance with the position of the member, which is connected to the output shaft 22, or the like.

As shown in FIGS. 4A to 4C, the position and the operational direction of the switch 50 in the condition in which the multi-shaft drive device is provided to the seat correspond to the movable direction of the movable mechanisms (the reclining mechanism, the front-back position adjustment mechanism of the seat, and the seating face height adjustment mechanism of seat) to be adjusted. Thus, the feeling of operation corresponds to the actual movement, and the multi-shaft drive device is thereby easily used.

[2] Second Embodiment

Figure 5:
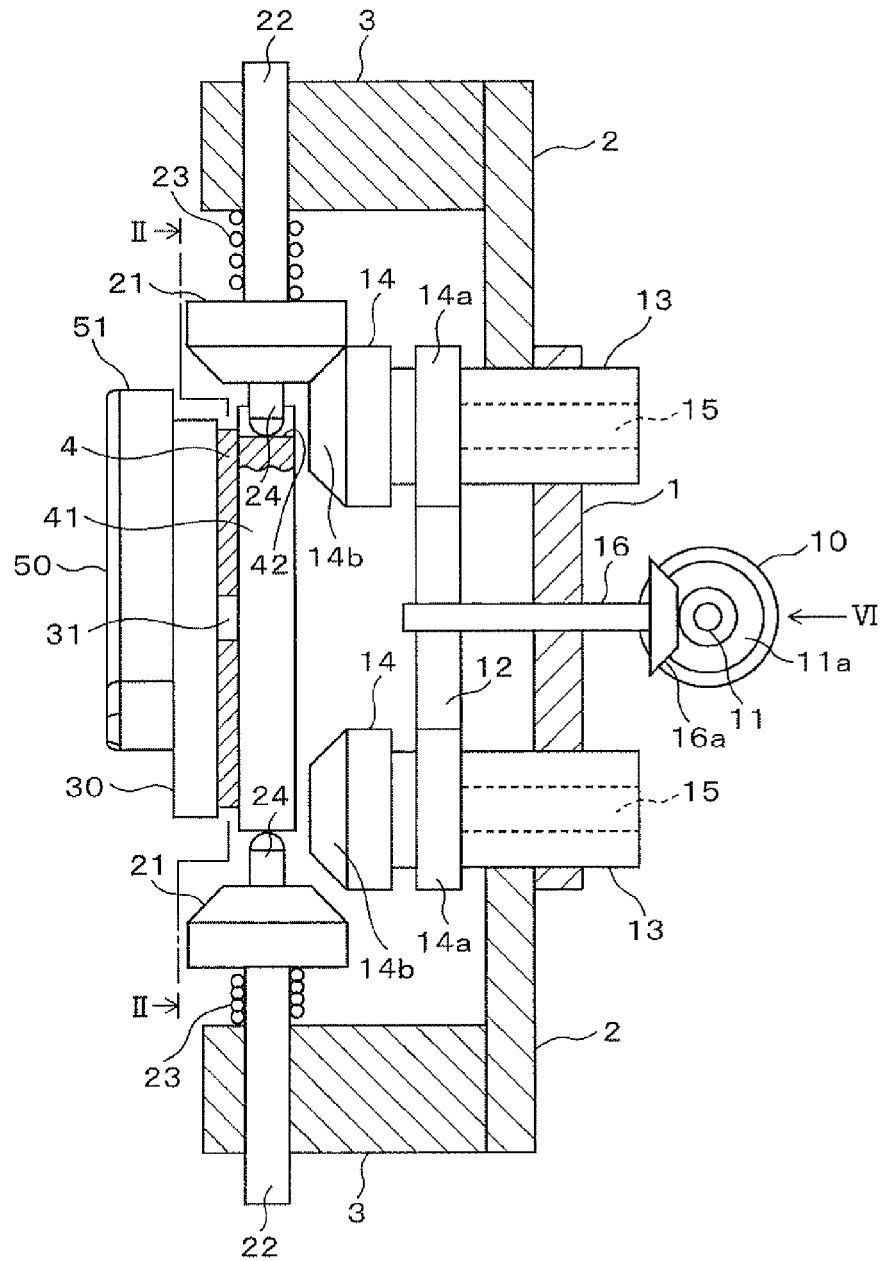
FIG. 5 is a front view of a multi-shaft drive device of a second embodiment according to the present invention, which includes local sectional view of a portion thereof.
Figure 6:
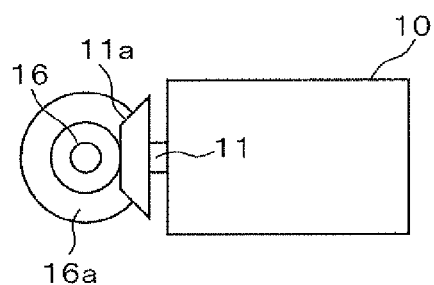
FIG. 6 is an arrow view taken in the direction of arrow VI in FIG. 5.

FIGS. 5 and 6 show the second embodiment of the present invention. The second embodiment is structured such that the rotational shaft of the motor 10 is disposed perpendicularly to the rotational shaft of the first input gear 12 in the structure of the first embodiment.

As shown in FIG. 6, a third input gear 11a which consists of a bevel gear is fixed at the leading end of the motor shaft 11 of the motor 10. An input shaft 16 is fixed at a center of the first input gear 12. A fourth input gear 16a which consists of a bevel gear engaging with the third input gear 11a is fixed at the leading end of the input gear 16.

In the second embodiment, the motor 10 is rotated, the rotation of the motor shaft 11 is transmitted from the third input gear 11a to the fourth input gear 16a, the first input gear 12 is rotated, and the second input gear 14 engaging with the first input gear 12 is rotated. The dial 30 is rotated, the pin 24 of the output gear 21 enters the recess of the cam 41, and the output gear 21 engages with the second input gear 14, so that the output shaft 22 fixed at the output gear 21 is rotated.

[3] Third Embodiment

Figure 7:
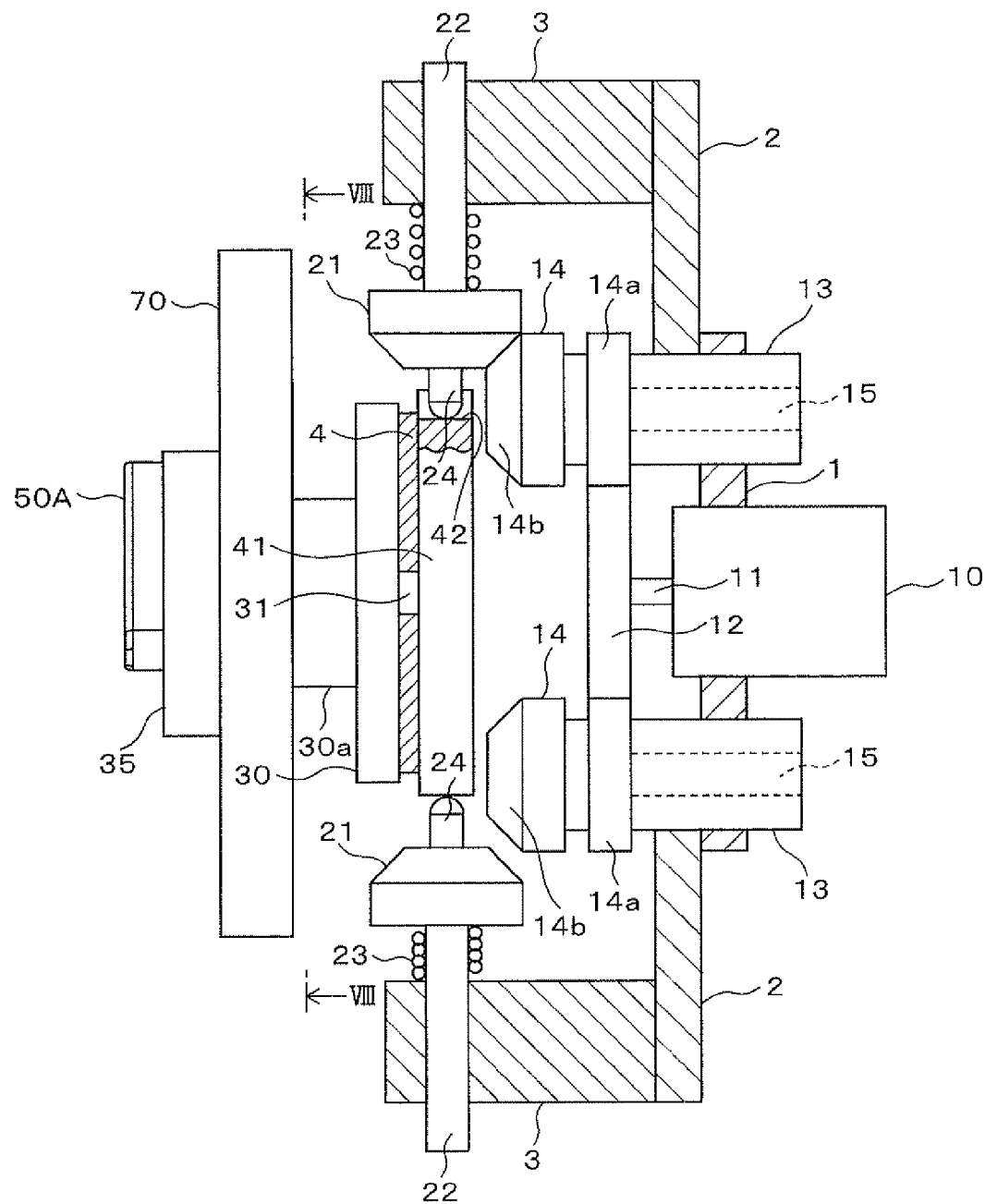
FIG. 7 is a front view of a multi-shaft drive device of a third embodiment according to the present invention, which includes local sectional view of a portion thereof.
Figure 8:
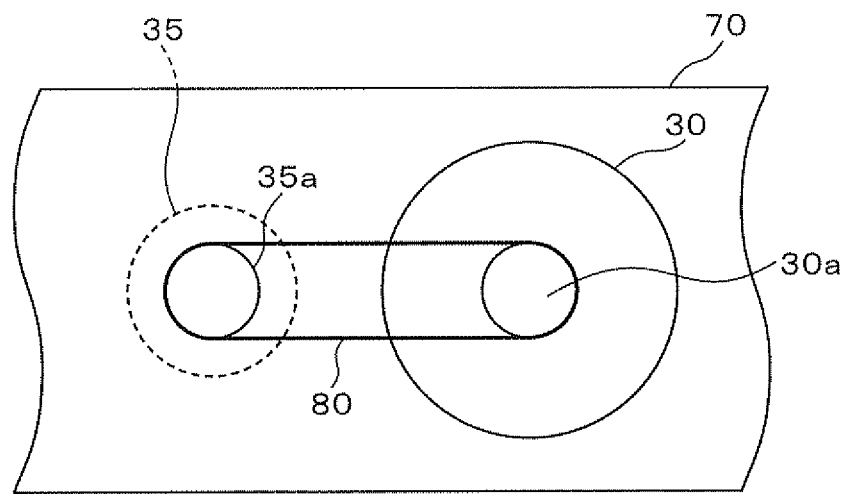
FIG. 8 is an arrow view taken in the direction of arrow VIII-VIII in FIG. 7.

FIGS. 7 and 8 show the third embodiment of the present invention. The third embodiment is constructed such that in the structure of the first embodiment, the rotational operation of the dial 30 (hereinafter referred to as "first dial 30" in this embodiment) is performed by using another dial (second dial) 35 and switching of connection of the output gear 21 is thereby performed.

The first dial 30 is rotatably supported by one surface side (right side in FIG. 7) of a frame 70 via a rotational shaft 30a. As shown in FIG. 8, the second dial 35 is rotatably supported by the other surface side (left side in FIG. 7) of the frame 70 via a rotational shaft 35a. In this case, the second dial 35 is positioned around the first dial 30 so as not to be coaxial with the first dial 30. A switch 50A having the same structure as that of the switch 50 is provided on the second dial 35. When the multi-shaft drive device is used for movable type vehicle seat in the same manner as in the first embodiment, the frame 70 is a frame (seat frame or the like).

As shown in FIG. 8, the rotational shaft 35a of the second dial 35 penetrates the frame 70 and projects on the one surface side, and a transmission belt (transmission member) 80 is wound on the rotational shaft 35a of the second dial 35 and the rotational shaft 30a of the first dial 30. The second dial 35 is rotated, and the rotation thereof is transmitted to the first dial 30 via the transmission belt 80, so that the first dial 30 is rotated and switching of connection of the output gear 21 is thereby performed.

In the third embodiment, the second dial 35 is disposed at a freely selected position apart from the first dial 30, and each dial 30 and 35 is connected by the transmission belt 80. Thus, the selection of the output shaft 25 which is driven by the cam 41 can be performed at a position flexible to the provided positions of the cam 41 and the dial 30. Thus, design freedom can be improved. Instead of the transmission belt 80, one gear or gear train, with which plural gears engage, is used as means for transmitting the rotation of the second dial 35 to the first dial 30.

[4] Fourth Embodiment

Figure 9:
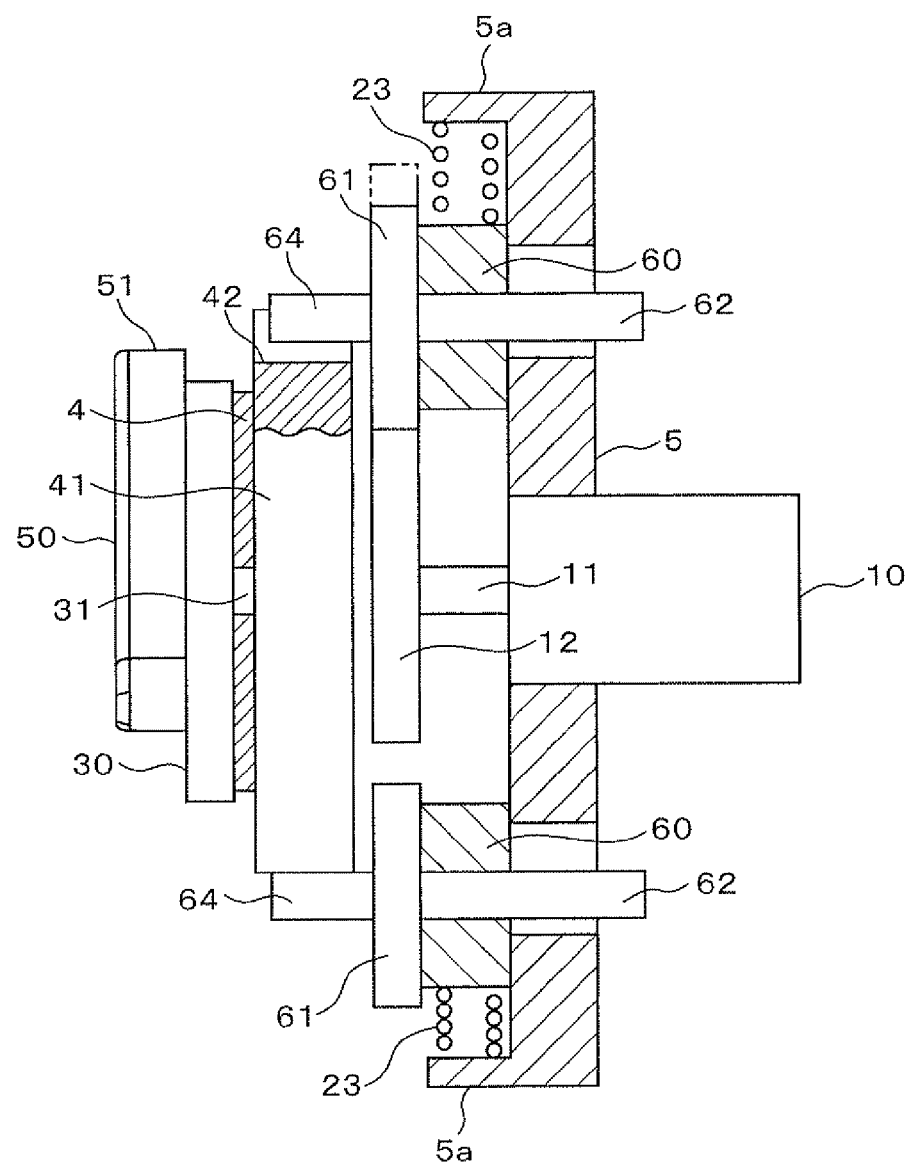
FIG. 9 is a front view of a multi-shaft drive device of a fourth embodiment according to the present invention, which includes local sectional view of a portion thereof.

FIG. 9 shows the fourth embodiment of the present invention. As shown in FIG. 9, three bearing blocks 60 are supported by a main frame 5 supporting the motor 10 so as to be slidable toward and counter to the first input gear 12. A spring washer 5a is provided at a peripheral portion of the main frame 5, and the coil spring 23 is disposed between the spring washer 5a and the bearing block 60. The bearing block 60 is biased toward the rotational center of the first input gear 12 by the coil spring 23.

An output shaft 62 of an output gear (output member) 61 is rotatably supported by the bearing block 60. The output gear 61 is a spur gear which can engage with the first input gear 12. A pin 64 projecting to one end side is integrally formed at the center of one end surface of the output gear 61.

In the fourth embodiment, the cam 40, the dial 30, and the switch 50, and the like are provided in the same manner as in the first embodiment. Three recesses 42 are formed at about the same positions of the cam 41 as in the first embodiment. On the other hand, the bearing blocks 60 are disposed to form an isosceles triangle. As shown in FIGS. 4A to 4C, every time the dial 30 is rotated by 45 degrees, the pin 64 of the output gear 61 enters the recess 42, and the output gear 61 engages with the first input gear 12. That is, the dial 30 is rotated from the condition shown in FIG. 9, so that the pin 64 which entered the recess 42 moves on the peripheral surface of the cam 41, and the output gear 61 is apart from the first input gear 12. When the pin 64 of the output gear 61 proximate to the above output gear 61 faces the recess 42, the bearing block 60 moves toward the first input gear 12 by the biasing force of the coil spring 23, and the output gear 61 engages with the first input gear 12. Thus, the rotation of the motor 10 is transmitted to the output shaft 62.

In the above fourth embodiment, the same actions and the effects as in the above embodiment can be obtained. In particular, in the above fourth embodiment, since the output gear 61 directly engages with the first input gear 12, the number of the gears is greatly reduced, and the structure is simplified.

[5] Fifth Embodiment

Figure 10:
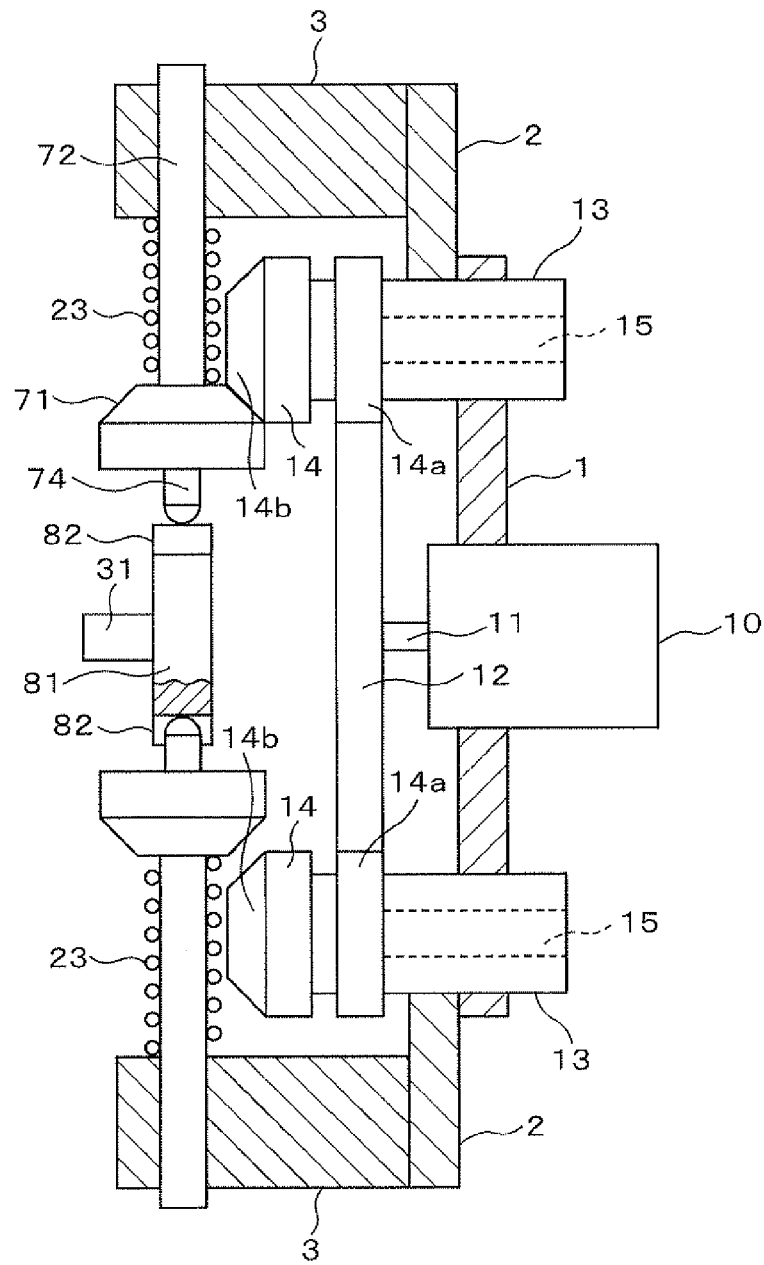
FIG. 10 is a local sectional front view of a multi-shaft drive device of a fifth embodiment according to the present invention, which includes local sectional view of a portion thereof.
Figure 11:
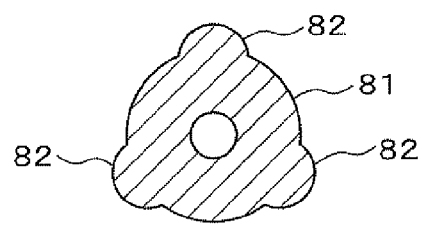
FIG. 11 is an axial direction cross sectional view of a cam of the fifth embodiment.

FIGS. 10 and 11 show the fifth embodiment of the present invention. In FIG. 10, reference numeral 71 denotes an output gear. The output gear 71 has an output shaft 72 and a pin 74 which are the same as those of the output gear 21 shown in FIG. 1. The output gear 71 has a bevel gear of which the direction is opposite to that of the bevel gear shown in FIG. 1, and the bevel gear of the output gear 71 is disposed at the inside of the second input gear 14.

In FIG. 10, reference numeral 81 denotes a cam. As shown in FIG. 11, three projections 82 having a cylindrical curved surface are formed at the peripheral portion of the cam 81 so as to be spaced 120 degrees from each other in a circumferential direction. When the pin 74 of the output gear 71 is disposed between the projections 82, the pin 74 is pressed onto the peripheral surface of the cam 81 by the biasing force of the coil spring 23. In this condition, the output gear 71 is away from the second input gear 14. From this condition, the cam 81 is rotated, and the pin 74 moves on the projection 82, so that the output gear 71 is moved toward the second input gear 14 against the biasing force of the coil spring 23, and the output gear 71 engages with the bevel gear portion 14b of the second input gear 14. Thus, the rotation of the motor 10 is transmitted to the output shaft 72. In the fifth embodiment, too, the dial 30 (not shown in the Figure) which is the same as in the first embodiment is fixed at the rotational shaft 31, and the switch 50 or the like (not shown in the Figure) are provided at the dial 30.

In the above fifth embodiment, the same actions and the effects as in the above embodiment can be obtained. In particular, in the above fifth embodiment, since the output gear 71 is moved toward the second input gear 14 by the projection 82 of the cam 81, even when permanent set occurs in the coil spring 23, the output gear 71 can reliably engage with the bevel gear portion 14b of the second input gear 14.

[6] Another Feature of the Present Invention

The present invention is not limited to each of the above embodiments. For example, instead of the structure (for example, the second input gear 14 and the output gear 21) in which teeth engage with each other, a structure, in which frictional surfaces contact each other, or the like can be used. The operational member of the present invention is not limited to dials 30 and 35, and a feature (lever or the like) in which one end portion is rotated may be used.

The structure for coupling with the movable sections of the seat shown in FIG. 4 is one example, and the positions and angles of the output gears 21 which are activated by the rotation of the dial 30 can be freely selected. The number of the output shafts can also be freely selected. For example, a structure for performing the height adjustment of the seating face at two positions (front position and rear position) of the seat can be used, and a structure having four output shafts can also be used for this case.

In the first embodiment, instead of the structure in which the output gear 21 engages with the second input gear 14, the first input gear 12 may be structured as a bevel gear, and the output gear 21 may engage with the first input gear 12.

In the above first to fifth embodiments, the selector member (the cam 41) of the present invention is rotated by the operational member (the dial 30), and the present invention includes an embodiment in which the selector member is linearly moved by the operational member. A sixth embodiment will be explained as this embodiment hereinafter.

[7] Sixth Embodiment

FIGS. 12 to 16

(1) Structure of Sixth Embodiment

Figure 12:
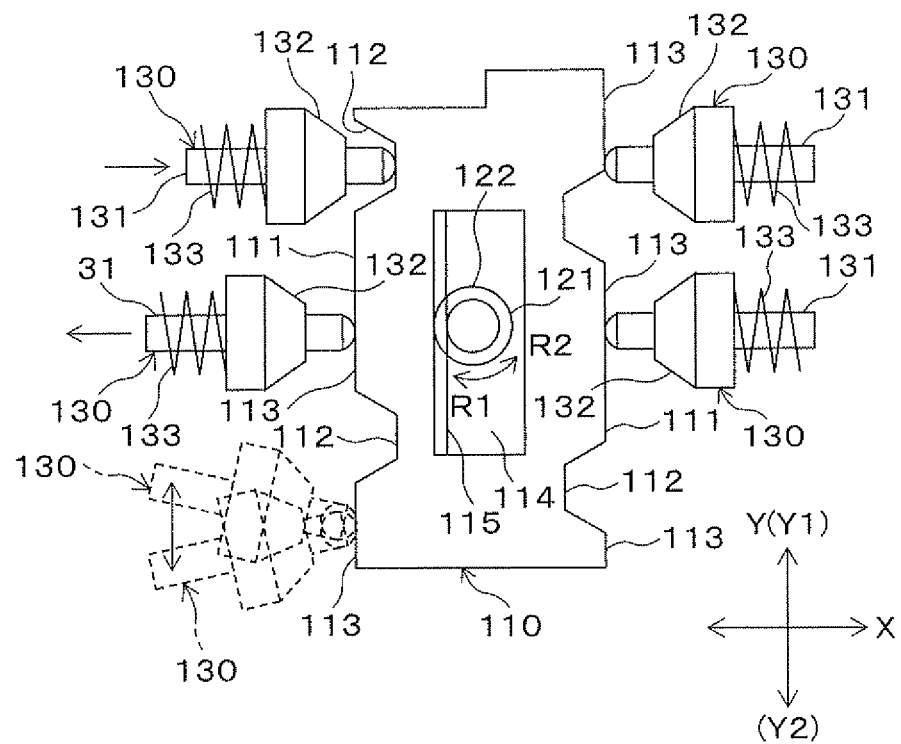
FIG. 12 is a plan view schematically showing a multi-shaft drive device of a sixth embodiment according to the present invention.
Figure 13:
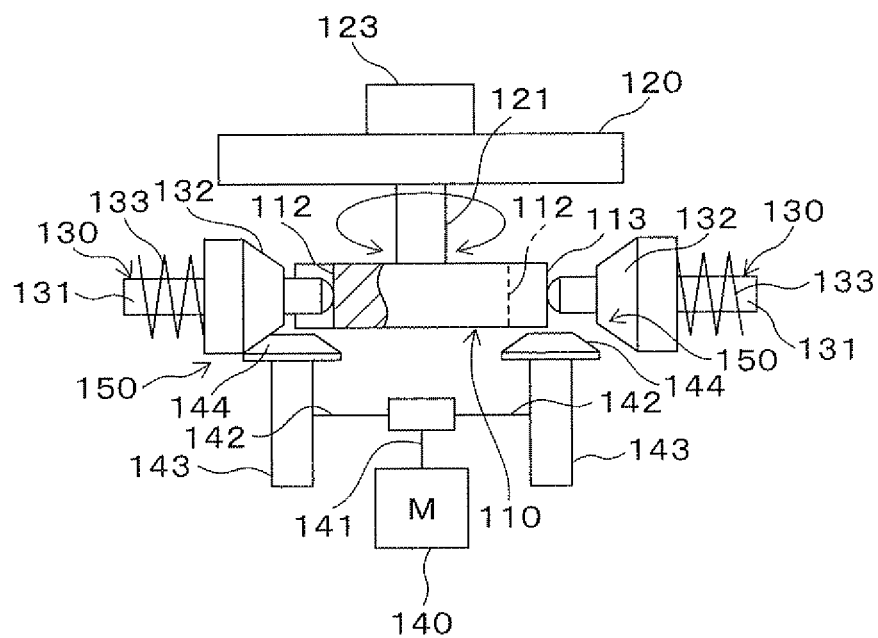
FIG. 13 is a front view schematically showing the multi-shaft drive device of the sixth embodiment.

FIGS. 12 and 13 show a multi-shaft drive device of the sixth embodiment. In these Figures, reference numeral 110 denotes a cam member (selector member). The cam member 110 is a horizontal plate-shaped member which is rectangular and long in the Y direction, and the cam member 110 is supported by a guide support member (not shown in the Figures) so as to be slidable in the longitudinal direction (Y direction, direction perpendicular to plane of the paper of FIG. 13). Both side surfaces extending in the longitudinal direction of the cam member 110 are cam surfaces 111, and plural recesses 112 opening in the thickness direction are formed at predetermined portions of these cam surfaces 111. Projections 113 extending in the Y direction are formed at both sides of the recesses 112 of the cam surfaces 111. A change portion extending from the recess 112 to the projection 113 are formed at an oblique plane.

A rectangle hole 114 extending in the Y direction is formed at the center portion of the cam member 110. A rack portion 115 having teeth aligned in the Y direction is formed on one inside surface of the hole 114 which extends in the Y direction. A pinion gear 122 formed on an operational shaft 121 engages with the rack portion 115 (rack and pinion mechanism). As shown in FIG. 13, the operational shaft 121 extends toward the upper side, and a circular plate-shaped dial (operational member) 120 is coaxially fixed at a leading end of the operational shaft 121. The dial 120 is rotated, so that the pinion gear 122 rotates together with the dial 120, and the rack portion 115 is driven by the pinion gear 122 and thereby moves in the Y direction. Thus, the cam member 110 moves linearly in the Y direction. That is, the operational shaft 121 is rotated in the R1 direction, so that the cam member 110 moves in the Y1 direction. The operational shaft 121 is rotated in the R2 direction, so that the cam member 110 moves in the Y2 direction.

Plural output shafts (output members) 130 extending in the X direction are aligned in the Y direction at both sides of the X direction of the cam member 110. In this case, the leading end of each output shaft 130 faces the cam surface 111. The output shafts 130 are supported by a support member (not shown in the Figures) so as to be movable toward and counter to the cam surface 111 in the axial direction (X direction). The output shaft 130 is structured such that a bevel gear 132 is integrally and coaxially formed at a middle portion of a shaft portion 131. In this case, the tooth surface of the bevel gear 132 faces the cam surface 111. A leading end (projection) of the shaft portion 131 which faces the cam surface 111 is formed in a curved shape. The cam member 110 is moved by the dial 120 in the Y direction, so that the output shafts 130 face the recess 112 or the projection 113.

The output shaft 130 is biased by a compression spring 133 so as to move toward the cam surface 111. The compression spring 133 is provided along the peripheral surface of the shaft portion 131 and engages with the bevel gear 132. The cam member 110 moves in the Y direction and the recess 112 faces the output shaft 130, so that the leading end portion of the output shaft 130 is biased by the compression spring 133 so as to enter the recess 112. The projection 113 faces the output shaft 130, so that the output shaft 130 moves on the projection 113 against the force of the compression spring 133, and the output shaft 130 moves backward.

As shown in FIG. 13, a motor 140, which has a motor shaft (rotational shaft of motor) 141 extending in the upper direction, is disposed at the lower side of the cam member 110. A clutch shaft 143 extending in the upper and lower direction is connected to the motor shaft 141 via a power transmission member 142. The power transmission member 142 may be one which transmits the rotation of the motor shaft 141 to the clutch shaft 143 and may not be limited. For example, a gear train, a belt, or the like may be used as a power transmission member 142.

The clutch shaft 143 is provided to each output shaft 130, and a bevel gear 144 is integrally formed at the upper end of the clutch shaft 143. The power of the motor 140 is transmitted to each clutch shaft 143 via the power transmission member 142, and in the action of the motor 140, each clutch shaft 143 is rotated. The clutch shaft 143 forms an input member of the present invention, and a clutch mechanism 150 of this embodiment is formed by the clutch shaft 143 having the bevel gear 144 and the bevel gear 132 of the output shaft 130. The action of the motor 140 is set in a power-on condition or in a power-off condition by using a switch 123 provided on the dial 120.

In this clutch mechanism 150, the output shaft 130 enters the recess 112 of the cam member 110, so that the bevel gear 132 engages with the bevel gear 144 proximate to the clutch shaft 143, and the bevel gear 132 is connected to the bevel gear 144. This connected condition is the left side condition in FIG. 13. The power of the motor 140 is transmitted to the output shaft 130 via the power transmission member 142, the clutch shaft 143, and the clutch mechanism 150, and the output shaft 130 rotates. In the condition in which the output shaft 130 moves on the projection 113 of the cam member 110, the bevel gear 132 proximate to the output shaft 130 is separated from the bevel gear 144 proximate to the clutch shaft 143, the clutch shaft 143 is idling, and the output shaft 130 does not rotate. This disconnected condition is the right side condition in FIG. 13.

(2) Action and Effects of Sixth Embodiment

In the above multi-shaft drive device, the dial 120 is operated so as to be rotated and the cam member 110 is moved in the Y direction, so that the output shaft 130 enters the recess 112 of the cam surface 111 of the cam member 110, the clutch mechanism 150 is in the connected condition, and this output shaft 130 rotates. Therefore, the output shaft 130 is selectively driven in accordance with the moved direction and the moved length in the Y direction of the cam member 110 by the rotation operation of the dial 120. The driven output shaft 130 is freely selected in accordance with the formed position of the recess 112 and the position of the output shaft 130. The formed position of the recess 112 and the position of the output shaft 130 are freely set, so that the number of the driven output shaft 130 can be set to one or be multiple.

In the movement of the cam member 110, the output shaft 130 is biased by the compression spring 133, so that the leading end of the output shaft 130 always abuts on the cam surface 111, and the leading end thereof is alternately slid on the recess 112 and the projection 113. In this case, since the leading end of the output shaft 130 is formed in a curved shape, and the change portion extending from the recess 112 to the projection 113 are formed at an oblique plane, the output shaft 130 smoothly slides on the cam surface 111.

Figure 14:
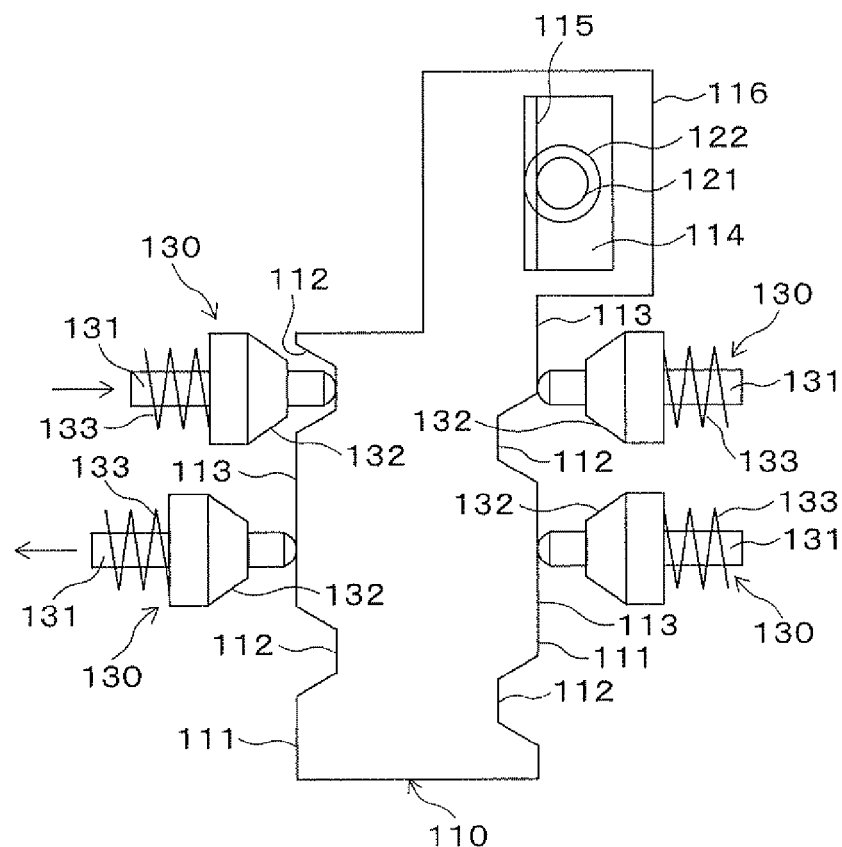
FIG. 14 is a plan view showing a modification example of the sixth embodiment.

In the multi-shaft drive device of the embodiment, in a case in which the cam member 110 can be moved in the Y direction, the position of the rack portion 115 can be freely selected. In FIG. 12, the rack portion 115 is formed on the inside surface of the hole 114 formed at the center of the cam member 110, and this is one example of a formed position of the rack portion 115. For example, as shown in FIG. 14, a projection 116 is integrally formed at one end portion of the longitudinal direction of the rack portion 115, and a hole 114 is formed at the projection 116. The same rack portion 115 is formed on the inside surface of the hole 114, and a pinion gear 122 of operational shaft 121 of dial 120 engages with the rack portion 115. In this feature, the position of the dial 120 can be relatively apart from the output shaft 130.

Thus, there is no restriction in the position of the dial 120 having the operational shaft 121 for operating the connection and disconnection of the clutch mechanism 150. The output shaft 130 can also be disposed at a freely position to the cam surface 111 of the cam member 110. For the above reasons, the freedom of the positions of the dial 120 including the operational shaft 121 and the output shaft 130 can be greatly improved. It is unnecessary to directly form the rack portion 115 at the cam member 110, and for example, the rack portion 115 may be indirectly formed at the cam member 110 via a transmission member (rod or the like). When the rack portion 115 is indirectly formed at the cam member 110, tooth row of the rack portion 115 may not be parallel to the movement direction of the cam member 110, and the tooth row of the rack portion 115 may be set freely, if possible.

Many output shaft 130 can be aligned along the cam surface 111 unless they interfere with each other, and if necessary, the cam surface 111 is long, so that more output shafts 130 can be aligned.

Figure 15:
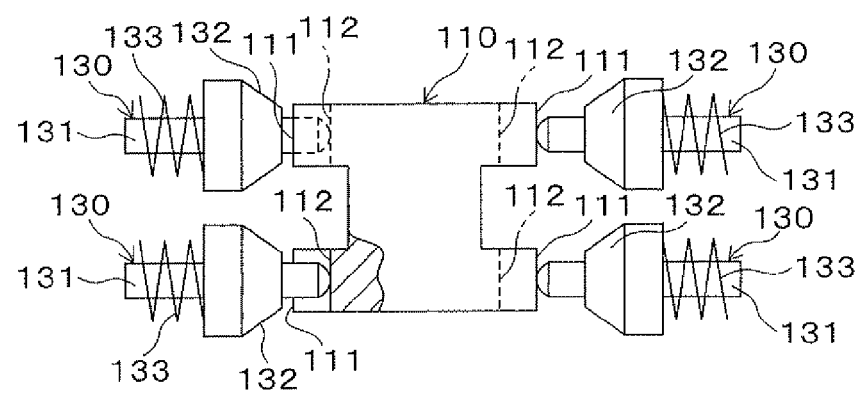
FIG. 15 is a side view showing another modification example of the sixth embodiment.
Figure 16:
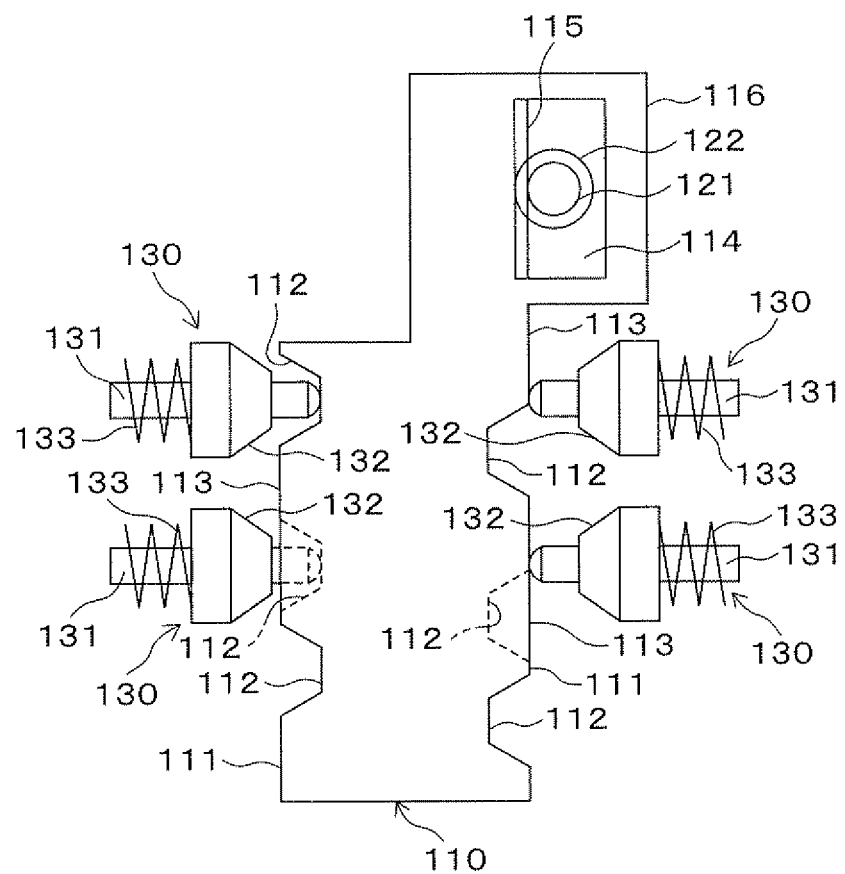
FIG. 16 is a plan view showing the above another modification example of the sixth embodiment.

The earn member 110 can be thicker. Alternatively, stereoscopic alignment pattern can also be used such that the stacking of plural cam members 110 or the like is performed, the plural steps of the cam surfaces 111 are provided in the upper and lower direction, and the output shafts 130 are provided so as to correspond to cam surfaces 111. FIGS. 15 and 16 show specific examples of the above plural step structure, and show modification examples of the embodiment shown in FIG. 14. In this case, two-stepped cam surfaces 111 are formed on both side surfaces of the cam member 110 in the thickness direction. That is, the cam surfaces 111 are formed in the two-stepped manner in a direction perpendicular to the above Y direction in which the cam surfaces 111 extend. The above recesses 112 are formed at predetermined positions of the upper cam surface 111 and the lower cam surface 111, and the output shafts 130, which correspond to the clutch mechanism 150, are aligned so as to correspond to the recesses 112. In this embodiment, it is advantageous that many output shafts 130 be provided to the device without the entirety of the device being long.

In the above embodiment, the axial direction of the output shaft 130 is disposed parallel to the X direction in FIG. 12. Instead of this, as shown in the dotted line in FIG. 12, the axial direction of the output shaft 130 may be disposed such that the facing angle of the output shaft 130 to the cam surface 111 is oblique. This feature is advantageous in that the positioned angle of the output shaft 130 can be adjusted in accordance with the desirable direction when the extending direction of the desirable output shaft 130 is not parallel to the X direction.

In the above embodiment, a stopper means which restricts the movement range of the cam member 110 is desirably provided since removal of the output shaft 130 from the cam surface 111 can be prevented. The stopper means may use any feature. For example, a member abutting at the end portion of the movement direction of the cam member 110 is used or a member controlling the rotation of the dial 120 is used.

In the above embodiment, the clutch mechanism 150 is in the connected condition when the output shaft 130 enters the recess 112, and the clutch mechanism 150 is in the disconnected condition when the output shaft 130 moves on the projection 113. Instead of this feature, an opposite action feature can be used. That is, the clutch mechanism 150 is in the disconnected condition when the output shaft 130 enters the recess 112, and the clutch mechanism 150 is in the connected condition when the output shaft 130 moves on the projection 113.

The multi-shaft drive device of the above embodiment is a desirable device used when a vehicle electrical seat is activated by the motor 140. That is, for example, each output shaft 130 is connected to movable mechanisms (for example, a mechanism which adjusts seating face height, a mechanism which adjusts an angle of seat backrest section, and a mechanism which adjusts a front-back position of seat) via a torque cable or the like, and the power of the motor 10 is selectively provided and transmitted to each movable mechanism so as to activate the movable mechanisms. However, the multi-shaft drive device of the present invention can be used not only for electrical seats but also for mechanical devices having plural movable mechanisms which are selectively driven.

The seventh to the twelfth embodiments of the present invention will be explained with reference to FIGS. 17 to 32. In these embodiments, a motor 200 is activated, a motor shaft (rotational shaft) 201 is thereby rotated, an input gear (input member) 202 is a spur gear fixed at the motor shaft 201, rotation of the input gear 202 is transmitted to plural output shafts (output members) 210 via a clutch mechanism 220 provided to each output shaft 210, and the output shaft 210 to be rotated is selected by cam members (selector members) 230, 240, 250, 260, 270, and 280. This structure is a basic common structure in these embodiments.

The output shaft 210 has the same structure as the output shaft 130 of the sixth embodiment. The output shaft 210 is constructed such that shaft portion 211 has a leading end formed in a curved shape and a bevel gear 212 is integrally and coaxially formed at a middle portion of the shaft portion 211. In this case, the tooth surface of the bevel gear 212 is directed to the leading end side. The leading end of the output shaft 210 is directed to the cam members 230, 240, 250, 260, 270, and 280, and the output shaft 210 is biased by a compression spring 213 engaging with the bevel gear portion 212 so as to move to the cam members 230, 240, 250, 260, 270, and 280 and abut thereto. The clutch mechanism 220 has a bevel gear 221 and the bevel gear 212 of the output shaft 210. The bevel gear 221 is disposed around the input gear 202 and rotates together with a spur gear 203 provided so as to engage with the input gear 202 and rotate. The bevel gear 212 can engage with the bevel gear 221. In the seventh to the twelfth embodiments, the cam members 230, 240, 250, 260, 270, and 280 mainly have corresponding characteristics, and the cam members 230, 240, 250, 260, 270, and 280 will be explained in each embodiment.

[8] Seventh Embodiment

Figure 17:
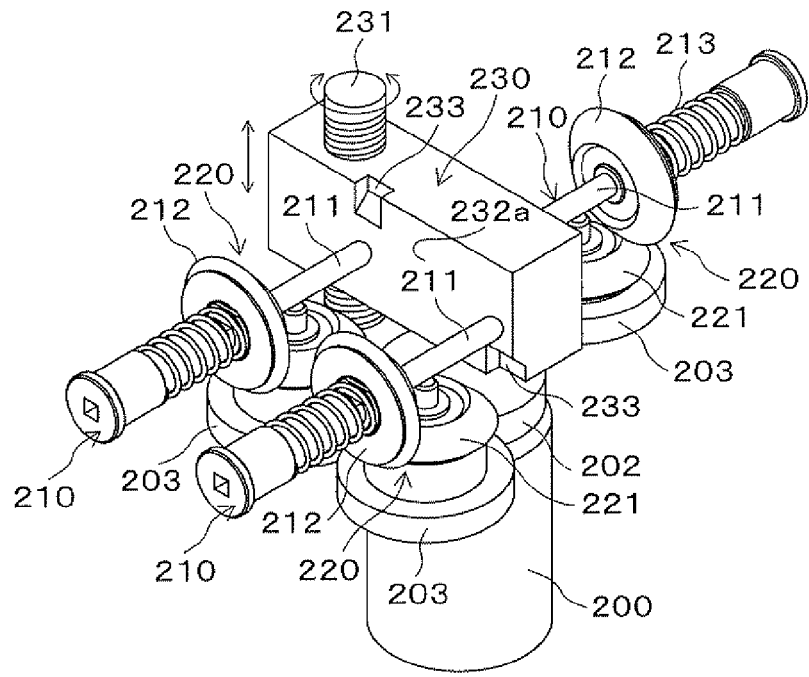
FIG. 17 is a perspective view showing a main section of a multi-shaft drive device of a seventh embodiment according to the present invention.
Figure 18:
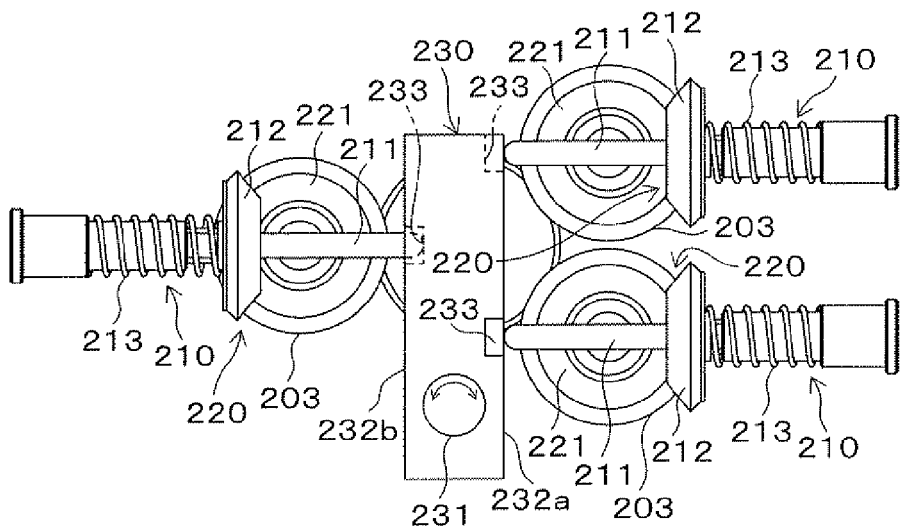
FIG. 18 is a plan view of the seventh embodiment.
Figure 19:
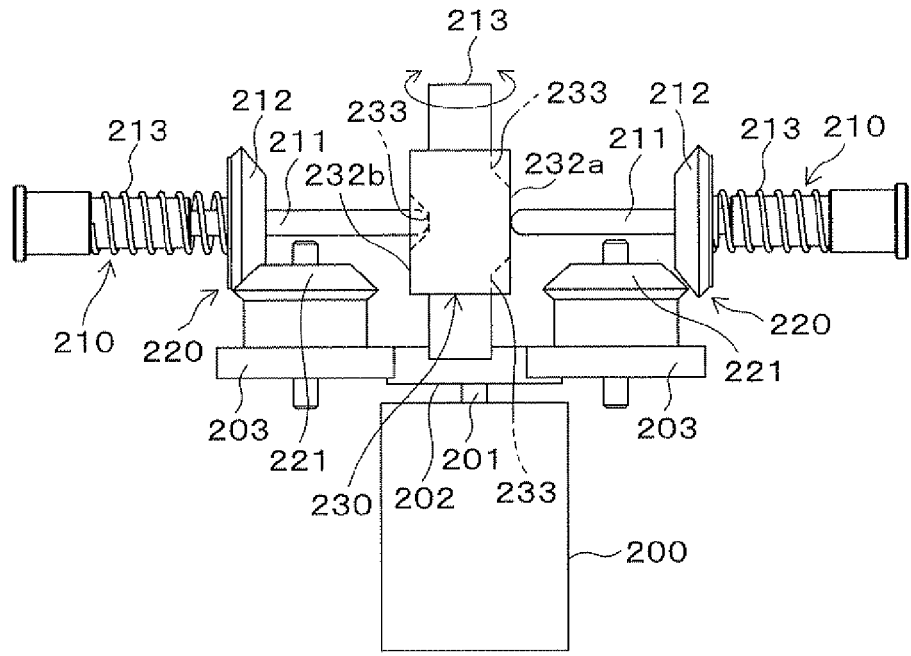
FIG. 19 is a side view of the seventh embodiment.

FIGS. 17 to 19

The cam member 230 of the seventh embodiment is formed in a rectangular parallelepiped, and the cam member 230 is supported by a guide member (not shown in the Figures) so as to be maintained in a condition in which the longitudinal direction is horizontal in FIG. 17 and so as to be movable in the upper and lower direction. A dial shaft 231, which has a screw formed on a peripheral surface thereof, penetrates from the upper side to an end portion of the cam member 230 and is screwed thereto. A circular plate-shaped dial (not shown in the Figures) is concentrically fixed at an upper end of the dial shaft 231. The dial is rotated, and the cam member 230 thereby moves upward or downward in accordance with the rotation direction of the dial. That is, the dial shaft 231 and the cam member 230 consists of a ball screw mechanism.

Recesses 233 are formed at both side surfaces 232a and 232b of the cam member 230 via oblique planes. The number and the formed position of the recess 233 are freely selected. In this case, the recesses 233 are formed at two positions (upper end portion and lower end portion) apart from each other in the longitudinal direction on the side surface 203a. The recess 233 is formed at a middle position of the upper and the lower direction on the side surface 203b, and this middle position corresponds to a position between the two recesses 233 formed on the side surface 232a.

The output shafts 210 are disposed at both sides of the cam member 230. The output shafts 210 are supported so as to be movable toward and counter to the cam member 230 at positions such that the leading ends of the output shafts 210 are perpendicular to each side surface 232a and 232b and abut thereto and the leading ends thereof can be fitted into each recess 233. When the leading ends of the output shafts 210 abut on the side surfaces 232a and 232b, the output shafts 210 move backward against the force of the compression spring 213. In this case, the bevel gear 212 moves apart from the bevel gear 221, and the clutch mechanism 220 is in disconnected condition. When the clutch mechanism 220 is disconnected, the power of the motor 200 is only transmitted to the bevel gear 221.

When the dial is rotated, the rotation of dial shaft 231 is transformed into upward or downward movement of the cam member 230, and the leading end of the shaft portion 211 is fitted into the recess 233 via the oblique plane, so that the output shaft 210 moves forward to the cam member 230. In this manner, the bevel gear 212 engages with the shaft portion 221, the clutch mechanism 220 is in connected condition. Thus, the power of the motor 200 is transmitted to the output shaft 210 of which the leading end of the shaft portion 211 fitted into the recess 233, and the output shaft 210 rotates. The dial is rotated, so that the cam member 230 moves upward and downward, and the leading end of the output shaft 210 moves away from the recess 233. Thus, the clutch mechanism 220 is in disconnected condition.

[9] Eighth Embodiment

FIGS. 20 to 23

Figure 20:
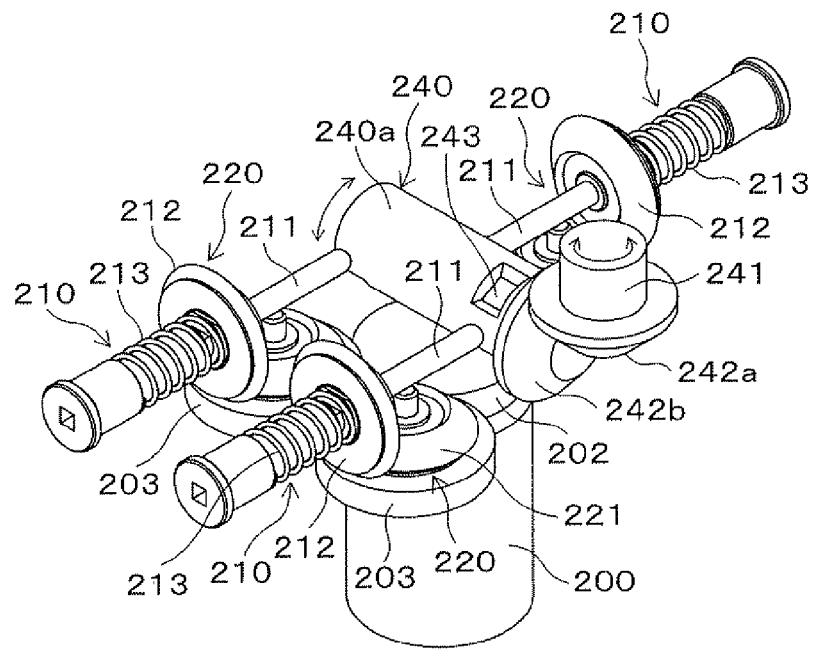
FIG. 20 is a perspective view showing a main section of a multi-shaft drive device of an eighth embodiment according to the present invention.
Figure 21:
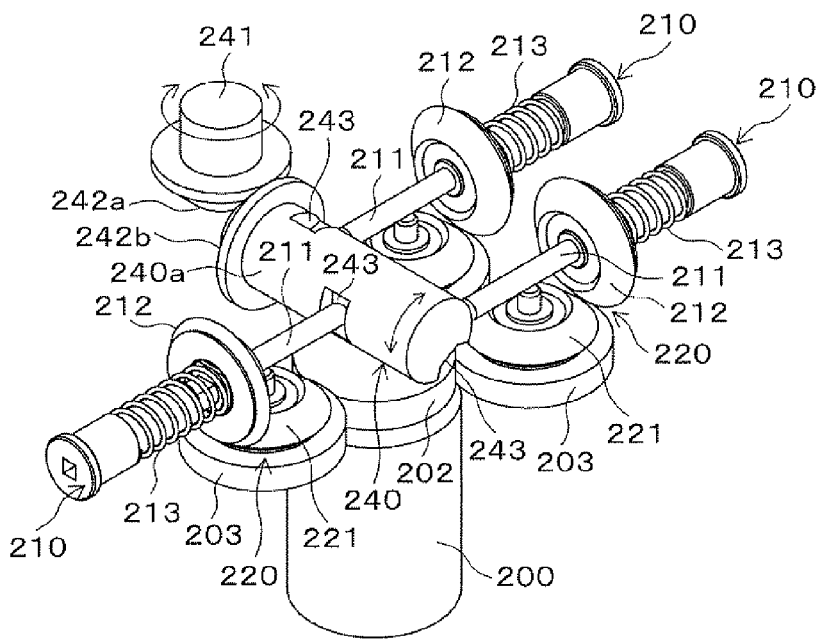
FIG. 21 is a perspective view of the eighth embodiment viewed from another direction.
Figure 22:
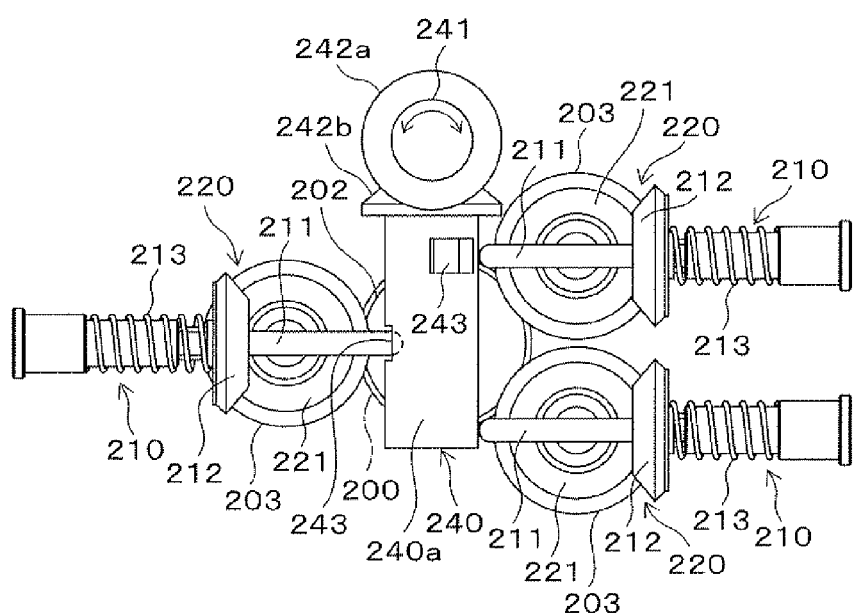
FIG. 22 is a plan view of the eighth embodiment.

A cam member 240 of the eighth embodiment is formed in a cylindrical shape, and the cam member 240 is supported by a bearing member (not shown in the Figures) so as to be rotatable around an axis of which direction is horizontal in FIGS. 20 and 21. A dial shaft 241 extending upward is connected to one end portion of the cam member 240 via bevel gears 242a and 242b engaging with each other. A circular plate-shaped dial (not shown in the Figures) is concentrically fixed at an upper end of the dial shaft 241. This dial is rotated, so that the cam member 240 rotates in a normal direction or an opposite direction in accordance with the rotational direction of the dial via the bevel gears 242a and 242b.

Figure 23:
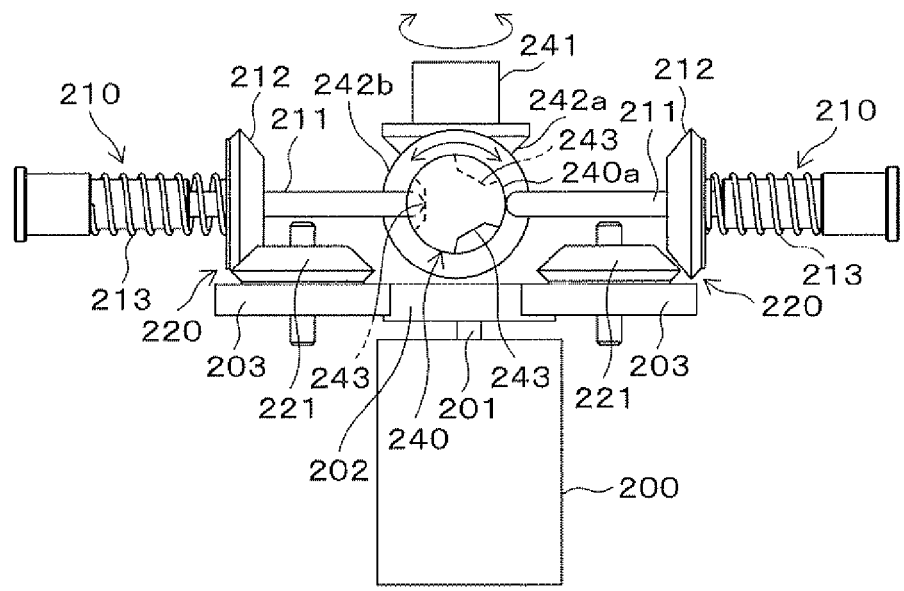
FIG. 23 is a side view of the eighth embodiment.

Plural recesses 243 are variably formed in the axial direction on a peripheral surface 240a of the cam member 240. The number and the formed positions of the recesses 243 on the peripheral direction are freely selected. In this case, as shown in FIG. 23, the recesses 243 are formed so as to be equally spaced from each other in the circumferential direction. The recess 243 is formed via the oblique plane such that the leading end of the output shaft 210 is smoothly separated from the recess 243. This structure is the same as those of the following embodiments.

The output shafts 210 are arranged along the radial direction of the cam member 240 at both sides of the cam member 240. The output shafts 210 are supported so as to be movable toward and counter to the cam member 240 at positions such that the leading ends of the output shafts 210 are perpendicular to the peripheral surface 240a and abut thereto and the leading ends thereof can be fitted into each recess 243. When the leading ends of the output shafts 210 abut on the peripheral surface 240a of the cam member 240, the output shafts 210 move backward against the force of the compression spring 213. In this case, the clutch mechanism 220 is in disconnected condition.

The dial is appropriately rotated and the cam member 240 thereby rotates, so that the leading end of the shaft portion 211 of the output shaft 210 is fitted into the recess 243, and the output shaft 210 moves forward to the cam member 240. In this manner, the clutch mechanism 220 is in connected condition, and the power of the motor 200 is transmitted to the output shaft 210 of which the leading end of the shaft portion 211 fitted into the recess 243, and the output shaft 210 rotates.

[10] Ninth Embodiment

Figure 24:
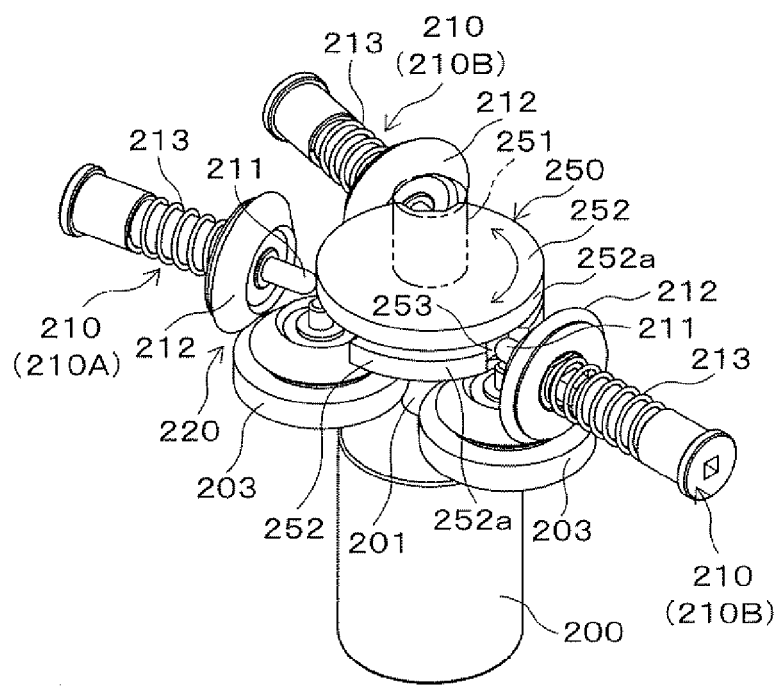
FIG. 24 is a perspective view showing a main section of a multi-shaft drive device of a ninth embodiment according to the present invention.
Figure 25:
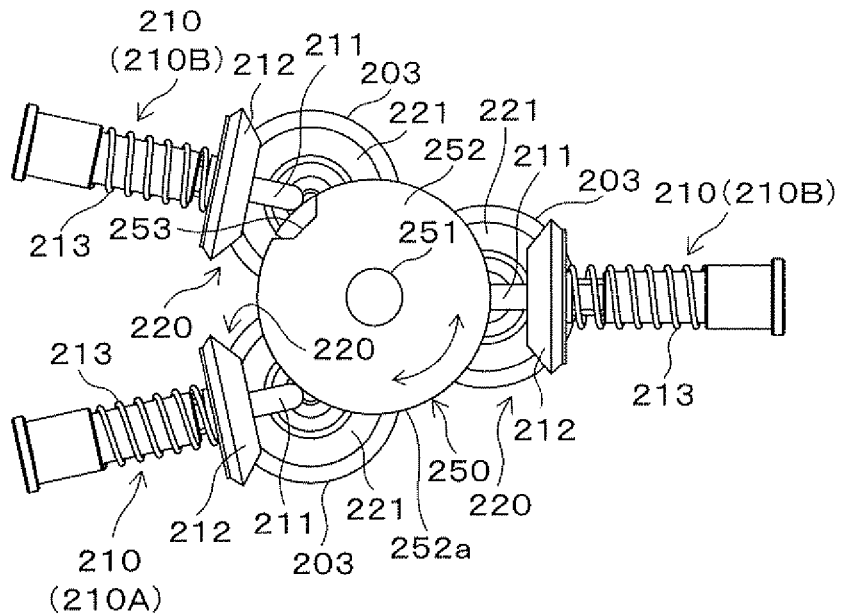
FIG. 25 is a plan view of the ninth embodiment.
Figure 26:
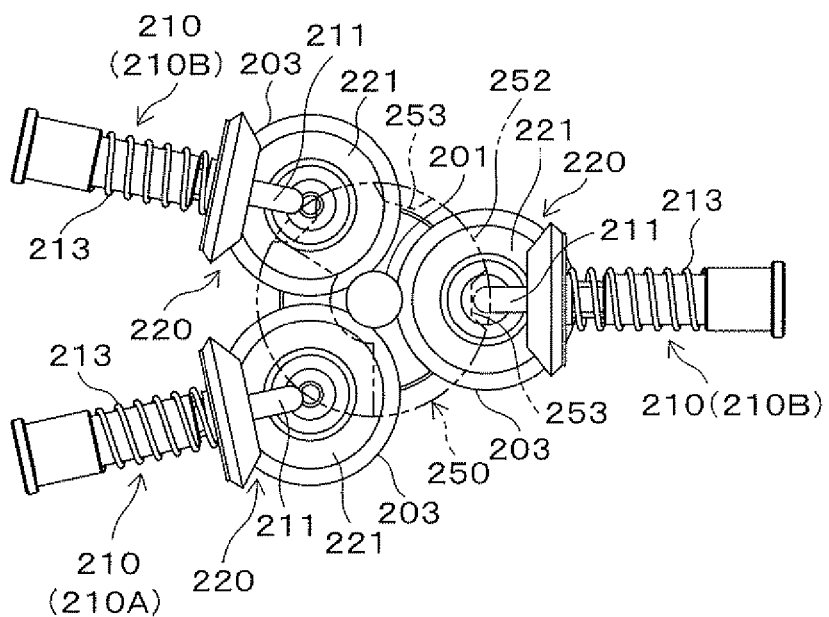
FIG. 26 is a plan view of the ninth embodiment in which a cam member is transparently drawn.

FIGS. 24 to 26

In the ninth embodiment, the spur gear 203 directly engages with the motor shaft 201. The spur gear 203 consists of the input member. The following embodiments 10 to 12 have this structure in the same manner.

A cam member 250 of the ninth embodiment is constructed such that two circular plates 252 having the same outer diameter are integrally and concentrically stacked. A dial (not shown in the Figures) is concentrically fixed at a dial shaft 251 provided at a center of the upper side circular plates 252. In this cam member 250, recesses 253 are formed at freely selected positions on a peripheral surface 252a of each circular plate 252. The number and the formed positions of the recesses 253 on the peripheral direction are freely selected. In this case, one recess 253 is formed at the upper side circular plate 252, and two recesses 253 are formed at the lower side circular plate 252.

The output shaft 210 is disposed so as to face each circular plate 252 of the cam member 250. In this embodiment, one output shaft 210 (hereinafter referred to as "201A") is provided to the upper side circular plate 252, and two output shafts 210 (hereinafter referred to as "201B") are provided to the lower side circular plate 252. The output shafts 210 are supported so as to be movable toward and counter to the cam member 250 at positions such that the leading ends of the shaft portions 211 abut to the peripheral surface 252a of each circular plate 252. When the leading end of the shaft portion 211 abuts on the peripheral surface 252a of each cam member 250, the output shaft 210 moves backward against the force of the compression spring 213. In this case, the clutch mechanism 220 is in a disconnected condition.

The dial is appropriately rotated and the cam member 250 is thereby rotated, so that the leading end of the shaft portion 211 of the output shaft 210 is fitted into the recess 253 of each circular plate 252, and the output shaft 210 moves forward to the cam member 250. In this manner, the clutch mechanism 220 is in connected condition, and the power of the motor 200 is transmitted to the output shaft 210 of which the leading end of the shaft portion 211 is fitted into the recess 253, and the output shaft 210 rotates. When the surfaces are provided in condition of plural steps as described in this embodiment, it is advantageous that many output shafts 210 be arranged in accordance with the number of steps, and more output shafts 210 can be provided in the device.

[11] Tenth Embodiment

Figure 27:
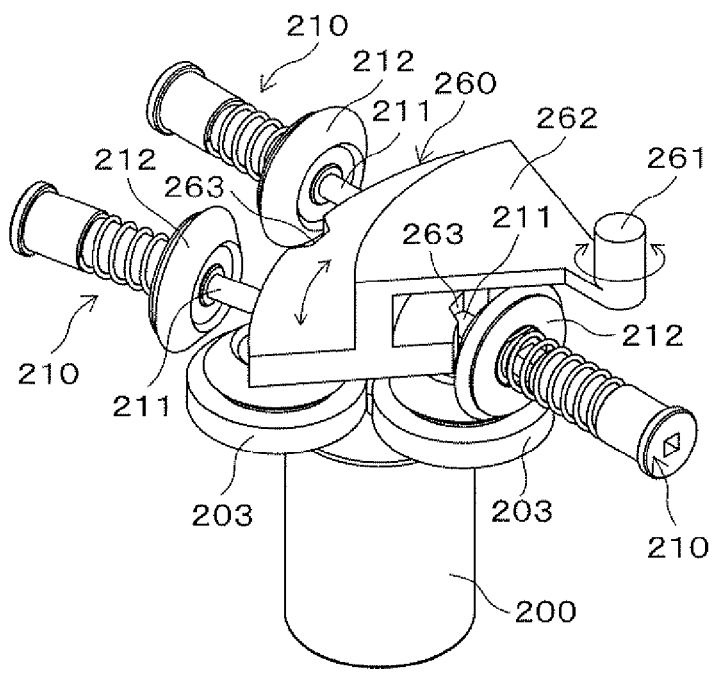
FIG. 27 is a perspective view showing a main section of a multi-shaft drive device of a tenth embodiment according to the present invention.
Figure 28:
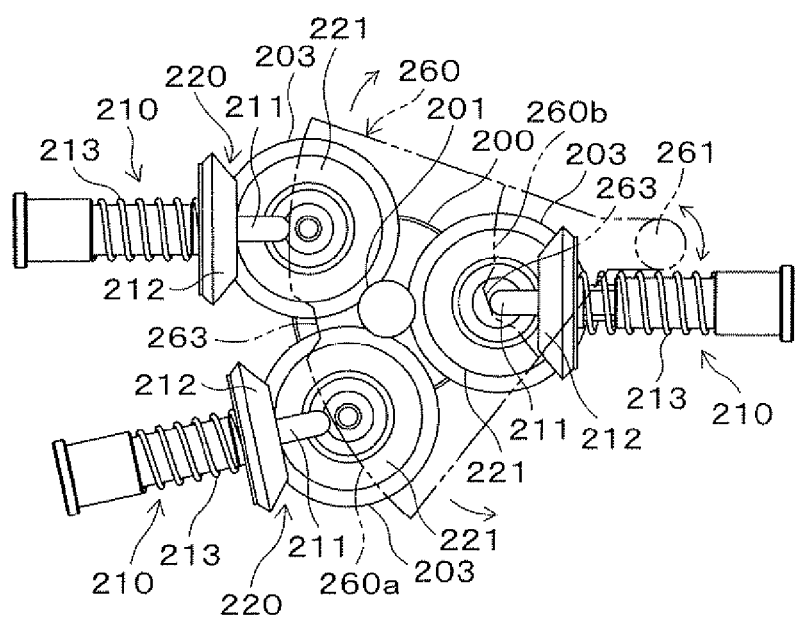
FIG. 28 is a plan view of the tenth embodiment in which a cam member is transparently drawn.

FIGS. 27 and 28

In the tenth embodiment, a cam member 260 is formed in a fan shape. The cam member 260 is integrally fixed at a dial shaft 261 of dial (not shown in the Figures) via a fan-shaped connecting plate 262. The cam member 260 uses the dial shaft 261 as a support point and is rotated by rotation of the dial. The cam member 260 has a peripheral surface 260a and an inner peripheral surface 260b, and recesses 263 are formed at the peripheral surface 260a and the inner peripheral surface 260b. The number and the formed position of the recesses 263 on the peripheral direction are freely selected. In this case, one recess 263 is formed approximately at the middle position of peripheral direction on the peripheral surface 260a, and one recess 263 is formed approximately at the middle position of peripheral direction on the inner peripheral surface 260b.

The output shafts 210 are disposed so as to face the peripheral surface 260a and the inner peripheral surface 260b of the cam member 260. In this embodiment, two output shafts 210 are provided at the peripheral surface 260a and one output shaft 210 is provided at the inner peripheral surface 260b. The output shafts 210 are supported so as to be movable toward and counter to the cam member 260 at positions such that the leading ends of the shaft portions 211 abut at the peripheral surface 260a and the inner peripheral surface 260b. When the leading ends of the shaft portions 211 abut at the peripheral surface 260a and the inner peripheral surface 260b, the output shafts 210 move backward against the force of the compression spring 213. In this case, the clutch mechanism 220 is in disconnected condition.

The dial is appropriately rotated and the cam member 260 is thereby rotated, so that the leading end of the shaft portion 211 is fitted into the recess 263, and the output shaft 210 moves forward to the cam member 263. The clutch mechanism 220 is in connected condition, and the power of the motor 200 is transmitted to the output shaft 210 of which the leading end of the shaft portion 211 is fitted into the recess 263 as described above, and the output shaft 210 rotates. In this embodiment, even when the dial cannot be disposed between the output shafts 210, switching of action of the output shaft 210 is performed, and it is advantageous that the layout freedom is improved.

[12] Eleventh Embodiment

Figure 29:
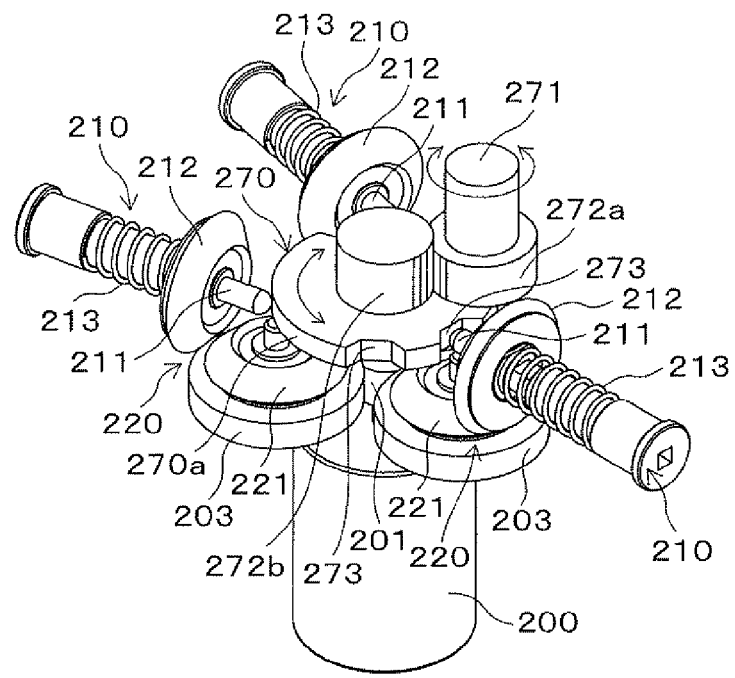
FIG. 29 is a perspective view showing a main section of a multi-shaft drive device of an eleventh embodiment according to the present invention.
Figure 30:
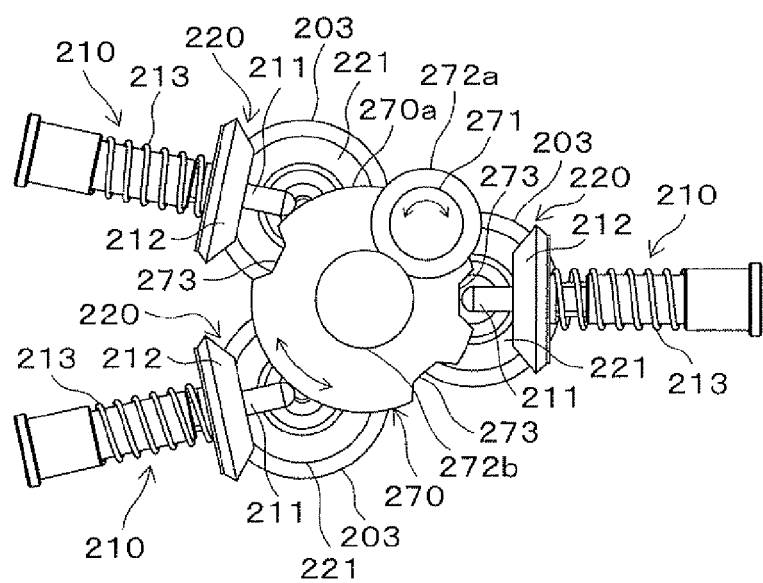
FIG. 30 is a plan view of the eleventh embodiment.

FIGS. 29 and 30

In the eleventh embodiment, a cam member 270 has a circular shape, and plural recesses 273 are formed at freely selected positions on a peripheral surface 270a thereof. The position of dial shaft 271 at which a dial (not shown in the Figures) is fixed is different from the rotational center of the cam member 270. The cam member 270 and the dial shaft 271 are connected by a pair of spur gears 272a and 272b. The dial is rotated, so that the cam member 270 rotates via the spur gears 272a and 272b.

The output shafts 210 are disposed so as to face the peripheral surface 270a of the cam member 270 in the same manner as in the ninth embodiment. When the leading end of the shaft portion 211 abuts on the peripheral surface 270a of the cam member 270, the output shaft 210 moves backward against the force of the compression spring 213. In this case, the clutch mechanism 220 is in disconnected condition.

The dial is appropriately rotated and the cam member 270 is thereby rotated, so that the leading end of the shaft portion 211 of the output shaft 210 is fitted into the recess 273 of the cam member 270, and the output shaft 210 moves forward to the cam member 270. In this manner, the clutch mechanism 220 is in connected condition, and the power of the motor 200 is transmitted to the output shaft 210 of which the leading end of the shaft portion 211 fitted into the recess 273, and the output shaft 210 rotates.

In this embodiment, in the same manner as in the tenth embodiment, even when the dial cannot be disposed between the output shafts 210, switching of action of the output shaft 210 is performed, and it is advantageous in that the layout freedom is improved. The gear ratio of the spur gears 272a and 272b is changed, so that the operational angle of the dial for connection and disconnection can be adjusted.

[13] Twelfth Embodiment

Figure 31:
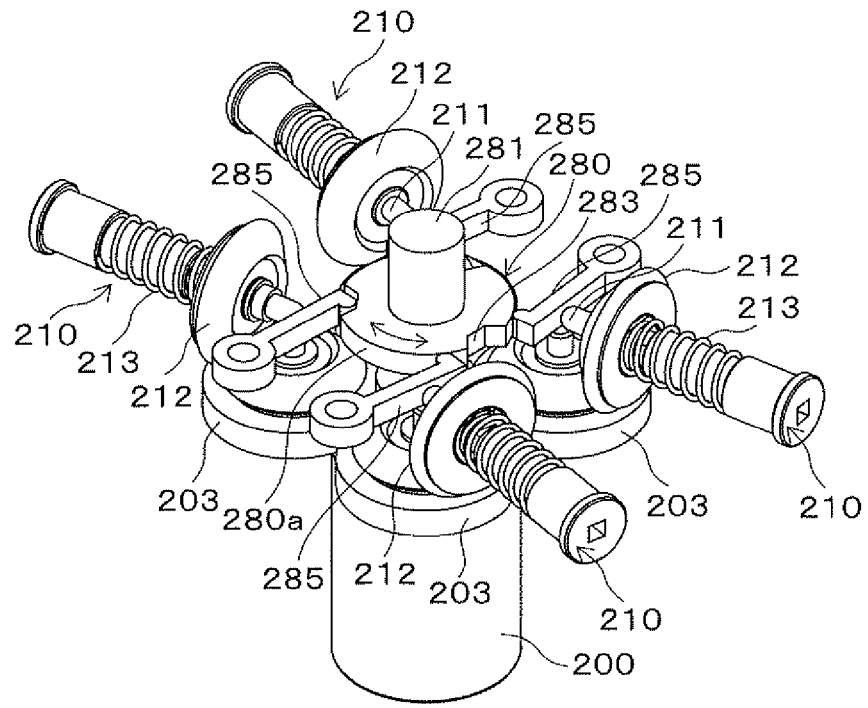
FIG. 31 is a perspective view showing a main section of a multi-shaft drive device of a twelfth embodiment according to the present invention.
Figure 32:
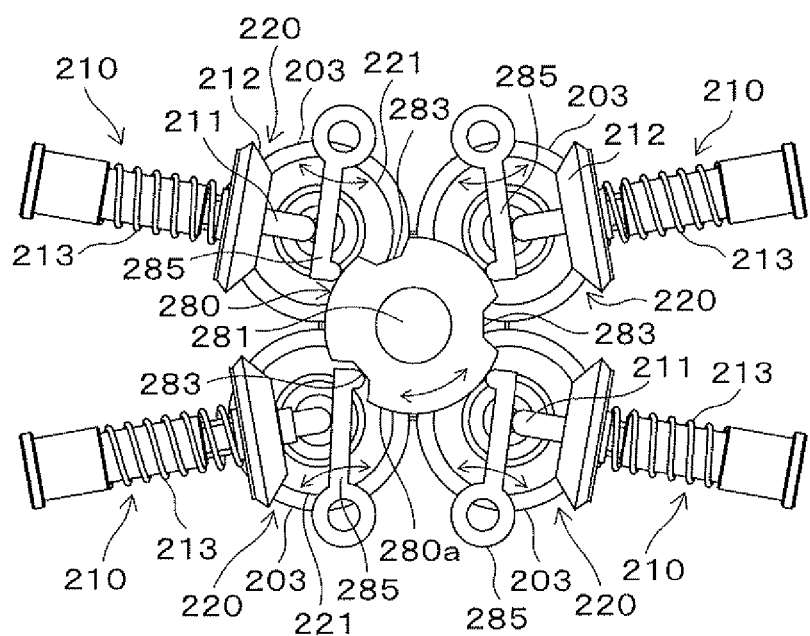
FIG. 32 is a plan view of the twelfth embodiment.

FIGS. 31 and 32

In the twelfth embodiment, a cam member 280 has a circular plate shape having plural recesses 283 formed at a peripheral surface 280a, and a dial (not shown in the Figures) is concentrically fixed via a dial shaft 281 provided at a center thereof. In this embodiment, in plural output shafts 210 disposed around the cam member 280, the leading ends of the shaft portion 211 do not abut directly on the peripheral surface 280a of the cam member 280, and leading ends of links 285, which are rotated by the output shafts 210 pressed by the compression springs 213, abut on the peripheral surface 280a and are fitted into the recesses 283.

That is, when the leading end of the link 285 abuts on the peripheral surface 280a of the cam member 280, the output shaft 210 moves backward against the force of the compression spring 213. In this case, the clutch mechanism 220 is in disconnected condition. The above dial is appropriately rotated and the cam member 270 is thereby rotated, so that the leading end of the link 285 is fitted into the recess 283, and the output shaft 210 moves forward to the cam member 280. Thus, in the output shaft 210, the clutch mechanism 220 is in connected condition, and the power of the motor 200 is transmitted to the output shaft 210 of which the leading end of the shaft portion 211 fitted into the recess 273, and the output shaft 210 rotates.

In the structure in which the link 285 is disposed between the cam member 280 and the output shaft 210, the force, which is generated when the cam member 280 moves the link 285 outward from the recess 283, is increased by the principle of leverage, so that even when the force by the compression spring 213 is strong, the action of the device can be reliably executed. The position and the shape of the link 285 are improved, so that even when the cam member 280 is small and the depth of the recess 283 is not set large, the output shaft 210 can be greatly moved by the lever ratio of the link 285. Thus, many recesses 283 can be provided at the cam member 280, many output shaft 210 can be disposed, the output shafts 210 can be freely arranged, and the freedom of layout can be improved.

The invention claimed is:

1. A multi-shaft drive device comprising:
   an input member connected to a rotational shaft of a motor;
   plural output members having an output shaft and are configured to connect to the input member, and to which rotation of the input member is transmitted when connected with the input member;
   a selector member operated by a manual operational member and faces the plural output members;
   concave portions provided on the surface of the selector member, the surface of the selector member facing the output members;
   a convex portion provided on the output member, where a position of the convex portion corresponds to a position of the concave portion of the selector member;
   a biasing means configured to bias the output member toward the selector member, the biasing means including: inserting the convex portion into the concave portion, and moving the output member toward the input member, thereby engaging the output member with the input member when the concave portion of the selector member faces the convex portion of the output member, the concave portion of the selector member being operated by the manual operational member.

2. The multi-shaft drive device according to claim 1, wherein
   the concave portion of the selector member is provided in a condition of plural steps in a direction perpendicular to an activating direction of the selector member.

3. The multi-shaft drive device according to claim 1, wherein
   facing angle of the output shaft with respect to the concave portion is freely selected.

4. The multi-shaft drive device according to claim 1, wherein
   the output member has a bevel gear, and the input member has a bevel gear of which an axis crosses an axis of the bevel gear of the output member and engages with the bevel gear of the output member.

5. The multi-shaft drive device according to claim 1, wherein
   the input member is a spur gear to which rotation of the motor is transmitted, and the output member has a spur gear which engages with the spur gear of the input member.

6. The multi-shaft drive device according to claim 1, wherein
   action mode of the selector member is rotation.

7. The multi-shaft drive device according to claim 6, wherein
   the multi-shaft drive device has a biasing means which biases the output member toward the input member; and
   the selector member includes a peripheral portion and a recess, wherein
   the peripheral portion has a cylindrical curved surface and allows the output member to be apart from the input member by contacting the output member, and
   the recess is provided at the peripheral portion and allows the output member to enter the recess and to be moved toward the input member.

8. The multi-shaft drive device according to claim 6, wherein
the input member has:
a first input gear which is connected to the rotational shaft of the motor; and
plural second input gears which are provided at a peripheral side of the first input gear, wherein
the second input gear has:
a first gear portion which engages with a peripheral portion of the first input gear; and
a second gear portion which removably engages with the output member.

9. The multi-shaft drive device according to claim 8, wherein
the output member can be freely positioned along a circle of which center is an axis of the second input gear.

10. The multi-shaft drive device according to claim 8, wherein
the second input gear can be freely positioned along a circle of which center is an axis of the first input gear.

11. The multi-shaft drive device according to claim 1, wherein
action mode of the selector member is linear movement.

12. The multi-shaft drive device according to claim 11, wherein
the linear movement of the selector member is performed by a rack and pinion mechanism provided between the selector member and the operational member.

13. The multi-shaft drive device according to claim 11, wherein
the multi-shaft drive device has a biasing means which biases the output member toward the input member and
the selector member includes a cam surface and a recess,
the cam surface allows the output member to be apart from the input member by contacting the output member, and
the recess is provided at the cam surface and allows the output member to enter the recess and to be moved toward the input member.

14. The multi-shaft drive device according to claim 11, wherein
the multi-shaft drive device has a stopper means which controls a movement range of the selector member.

15. A multi-shaft drive device comprising:
an input member which is connected to a rotational shaft of a motor;
plural output members which have an output shaft and are engageably provided to the input member, and to which rotation of the input member is transmitted when engaging with the input member;
a selector member which is provided between the plural output members and has an action portion, the selector member being activated, the action portion facing one of the output members and acting thereon, thereby moving the one of the output members toward the input member and selectively engaging the one of the output members with the input member; and
a rotary operational member which is connected to the selector member, the operational member being rotated so that selector member is activated,
wherein a movable portion of a predetermined movable mechanism is connected to the output member,
a switch which activates the motor is slidably provided at the operational member,
the switch is slid in one direction, and the motor is thereby rotated in a normal direction, and the switch is slid in a direction opposite to the one direction, and the motor is thereby rotated in a reverse direction, and
slide direction of the switch corresponds to a movable direction of the movable portion.

16. The multi-shaft drive device according to claim 15, wherein
the movable mechanism is a vehicle seat, and
the output member is connected to an adjustment mechanism of the movable portion of the vehicle seat.

17. The multi-shaft drive comprising:
an input member connected to a rotational shaft of a motor;
plural output members having an output shaft and are configured to connect to the input member, and to which rotation of the input member is transmitted when connected to the input member;
a selector member which is operated by a manual operational member and faces the plural output members;
a rotatable link provided between the output member and the selector member;
concave portions provided on the surface of the selector member, the surface of the selector member facing the link;
a convex portion provided on the link where a position of the convex portion corresponds to a position of the concave portion of the selector member;
a biasing means configured to bias the link via the output member toward the selector member, wherein
the convex portion is inserted into the concave portion by the biasing member and the output member corresponding to the link is engaged with the input member when the concave portion of the selector member faces the convex portion of the link, the concave portion of the selector member being operated by the manual operational member.

18. A multi-shaft drive device comprising:
an input member connected to a rotational shaft of a motor;
plural output members having an output shaft and are configured to be connected to the input member, and to which rotation of the input member is transmitted when connected to the input member;
a selector member which is provided between the plural output members and has an action portion, the selector member being activated, the action portion facing one of the output members and acting thereon, thereby moving the one of the output members toward the input member and selectively engaging the one of the output members with the input member; and
a rotary operational member which is connected to the selector member, the operational member being rotated so that selector member is activated, wherein
action mode of the selector member is linear movement,
the multi-shaft drive device has a biasing means which biases the output member in a direction in which the output member is apart from the input member, and
the selector member has a cam surface and the recess,
the cam surface allows the output member to be apart from the input member by contacting the output member,
the projection is provided at the cam surface, and presses the output member and thereby moves the output member toward the input member.

* * * * *